United States Patent [19]

Sakamoto et al.

[11] Patent Number: 5,175,793
[45] Date of Patent: Dec. 29, 1992

[54] RECOGNITION APPARATUS USING ARTICULATION POSITIONS FOR RECOGNIZING A VOICE

[75] Inventors: Kenji Sakamoto, Nara; Kouichi Yamaguchi, Tenri, both of Japan

[73] Assignee: Sharp Kabushiki Kaisha, Osaka, Japan

[21] Appl. No.: 473,238

[22] Filed: Jan. 31, 1990

[30] Foreign Application Priority Data

Feb. 1, 1989 [JP] Japan .................................. 1-23377
Feb. 2, 1989 [JP] Japan .................................. 1-26033

[51] Int. Cl.$^5$ .............................................. G10L 9/10
[52] U.S. Cl. ...................................................... 395/2
[58] Field of Search .................... 381/41-45; 364/513, 513.5

[56] References Cited

U.S. PATENT DOCUMENTS

| | | | |
|---|---|---|---|
| 4,087,632 | 5/1978 | Hafer | 381/43 |
| 4,624,010 | 11/1986 | Takebayashi | 381/41 |
| 4,712,243 | 12/1987 | Ninomiya et al. | 381/43 |
| 4,760,604 | 7/1988 | Cooper et al. | 382/15 |
| 4,802,103 | 1/1989 | Faggin et al. | 364/513 |
| 4,805,225 | 2/1989 | Clark | 382/15 |
| 4,829,572 | 5/1989 | Kong | 381/43 |
| 4,856,067 | 8/1989 | Yamada et al. | 381/45 |
| 4,876,731 | 10/1989 | Loris et al. | 382/15 |
| 4,975,961 | 12/1990 | Sakoe | 381/43 |
| 4,980,917 | 12/1990 | Hutchins | 381/41 |

OTHER PUBLICATIONS

Yoshua Bengio and Renato De Mori, "Use of Neural Networks for the Recognition of Place of Articulation", IEEE, ICASP, S3.2, 1988, pp. 103-106.

Primary Examiner—Michael R. Fleming
Assistant Examiner—Michelle Doerrler
Attorney, Agent, or Firm—Robert F. O'Connell

[57] ABSTRACT

A first voice recognition apparatus includes a device for analyzing frequencies of the input voice and a device coupled to the analyzing unit for determining vowel zones and consonant zones of the analyzed input voice. The apparatus further includes a device for determining positions of articulation of an input voice determined from the vowel zones by calculating from frequency components of the input voice in accordance with a predetermined algorithm based on frequency components of monophthongs having known phonation contents and positions of articulation. A second voice recognition apparatus includes a device for analyzing frequencies of the input voice so as to derive acoustic parameters from the input voice. A pattern converting unit is coupled to the analyzing unit and uses a neural network for converting the acoustic parameters to articulartory vectors. The neural network is capable of learning, by the error back propagation method using target data produced by a predetermined sequence based on the acoustic parameters, to create rules for converting the acoustic parameters of the input voice to articulatory vectors having at least two vector elements. A recognizing unit is coupled to the pattern converting unit for recognizing the input voice by comparing a feature pattern of the analyzed input voice having the articulatory vector with reference feature patterns in a predetermined sequence. A storage unit is coupled to the recognizing unit for storing the reference feature patterns having the articulatory vectors created by the pattern converting unit.

4 Claims, 13 Drawing Sheets

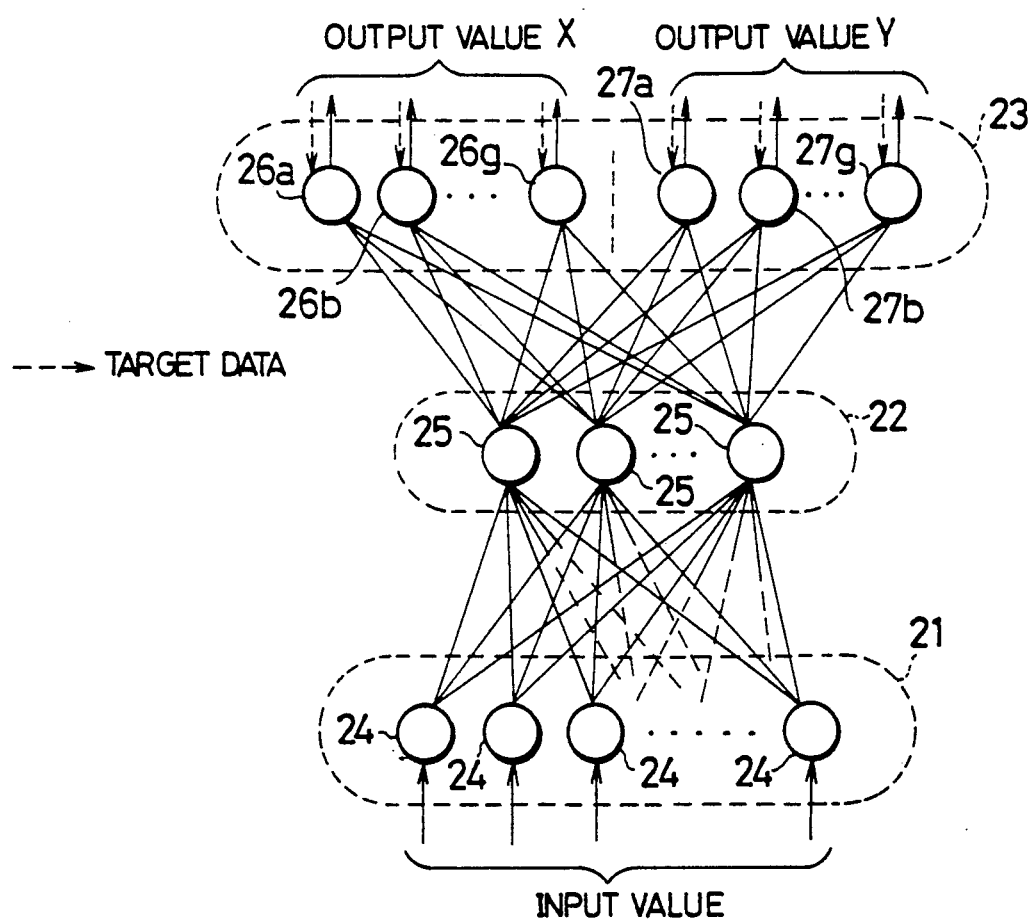

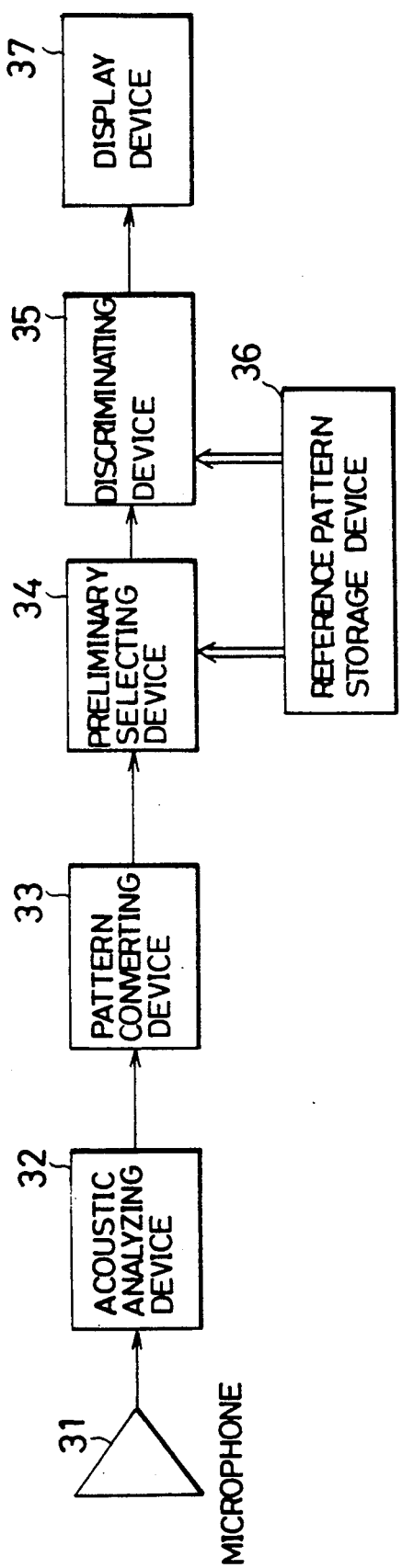

Fig. 13a
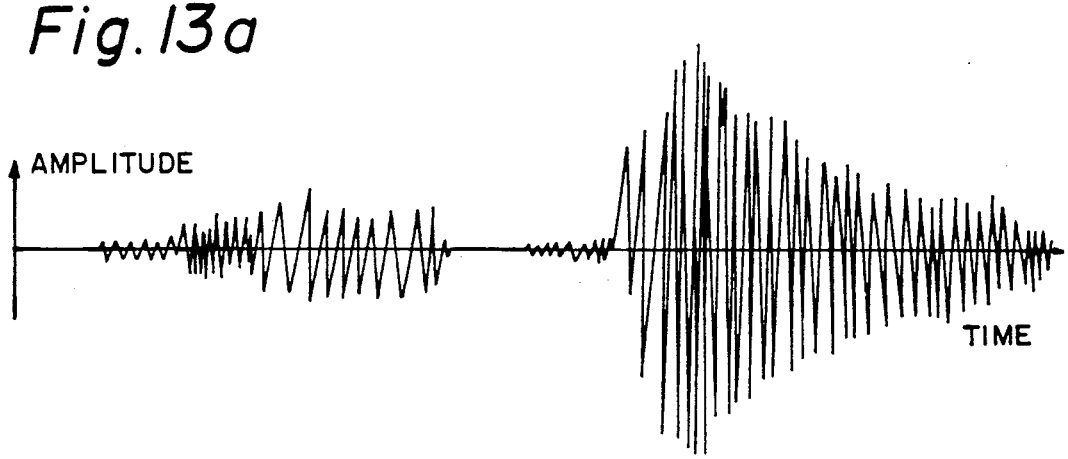
Fig. 13b
| bb bb dzdzdz i i u u u s s bb bb d a a a a e e e i i i i |
Fig. 13c
| c | 0 | 1 | 2 | 0 | 1 | 2 |
Fig. 13d
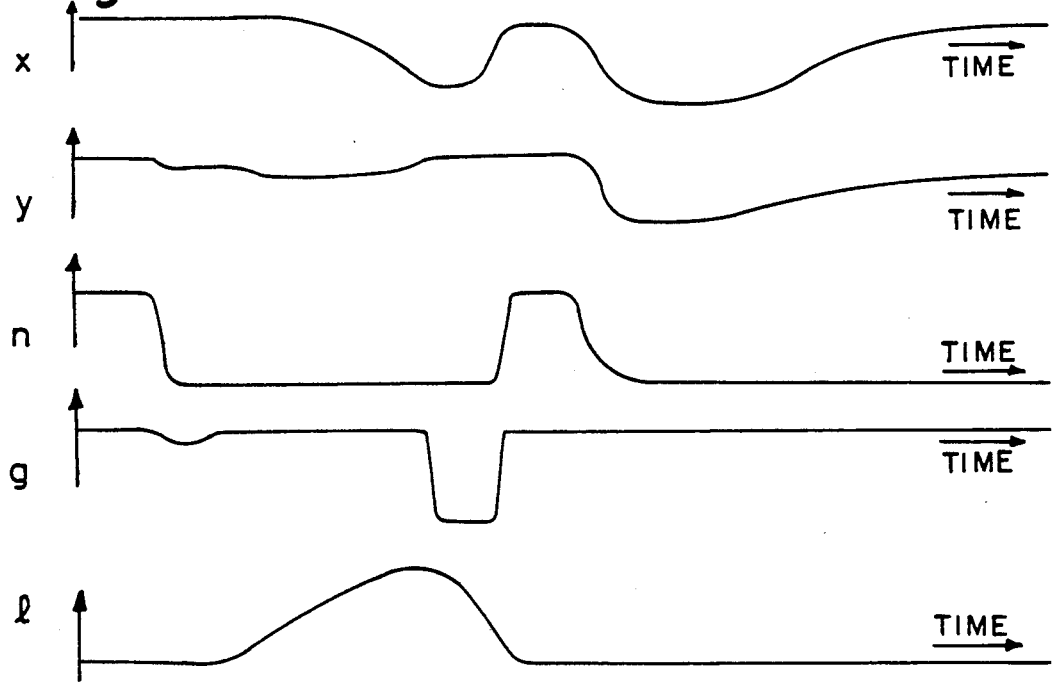

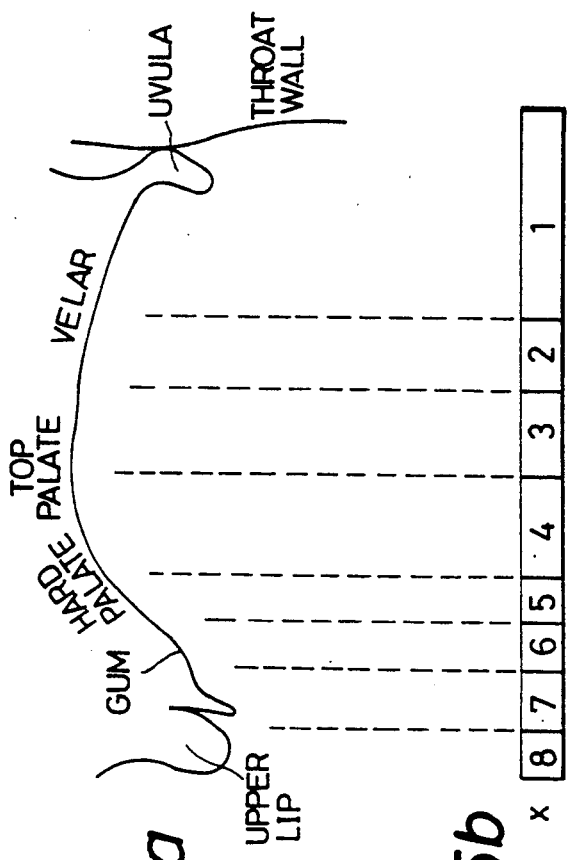
Fig.15a
Fig.15b
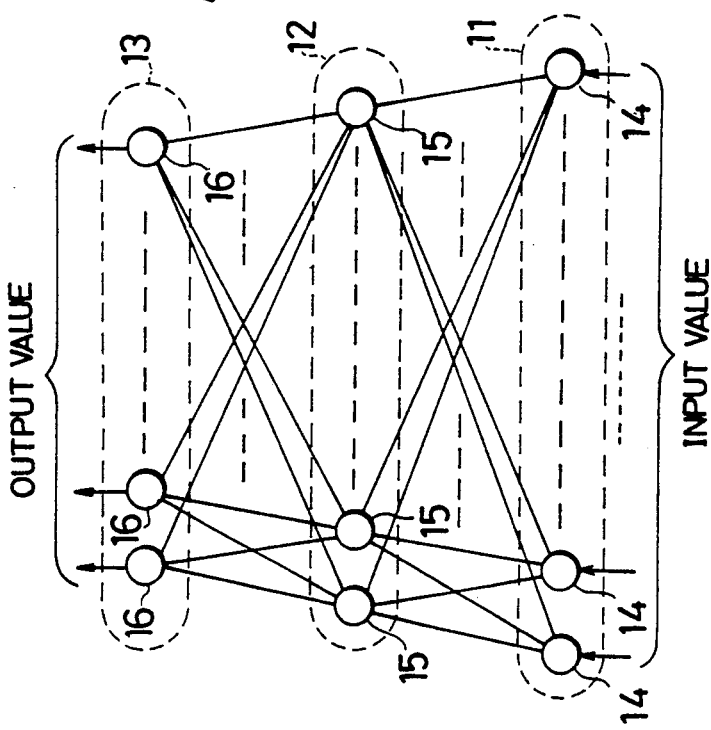
Fig. 14

RECOGNITION APPARATUS USING ARTICULATION POSITIONS FOR RECOGNIZING A VOICE

BACKGROUND OF THE INVENTION

1. Field of the Invention

The present invention relates to a voice recognition apparatus which can extract feature variables from an input voice independently of speakers and languages, and which can absorb fluctuations dependent on speakers and effectively reduce an amount of calculations in matching for voice recognition.

2. Description of the Related Art

Voice recognition apparatus are generally divided into two systems. One system is a word voice recognition system in which word voices are recognized through matching by the use of reference patterns composed of words as units. The other system is a phoneme recognition system in which word phonemes are recognized through matching by the use of standard patterns composed of phonemes or syllables, smaller than words, as units.

The word voice recognition system has no problem of false recognition due to articulatory coupling and can provide a high rate of recognition. However, the word voice recognition system has a problem such that the number of reference patterns is increased with increasing the number of vocabularies, which requires a large memory capacity and a great deal of calculations in matching. Particularly, in the case of recognizing many and unspecified speakers, a plurality of reference patterns (multi-templates) are needed for each word, because voices are largely fluctuated dependent on individual speakers. Such voice fluctuations are attributable to various factors. Thus, since speakers have their own physiological factors such as sex, age, and length of a vocal tract, voices are fluctuated as speakers change. In the case of a single speaker, voice fluctuations are also caused if the speaker makes voices in a different manner (loudness, voice production speed, etc.) dependent on circumstances, or if the surrounding noise is varied.

Therefore, the problem arisen by increasing the number of vocabularies has been dealt with as follows. In order to reduce the number of reference patterns for use in matching, preliminary selection of the reference patterns is performed before executing principal matching, based on the intermediate result of DP matching among the reference patterns, durations, global features and local features of the input voices.

However, there has not yet been found an approach of completely eliminating voice fluctuations due to change of speakers.

Applicants know that, to some extent, sound source characteristics among fluctuations depending on speakers can be compensated by passing voices through primary to tertiary adaptive inverted filters of the critical damping type. It has also been attempted to normalize a difference between the individual speakers by making a voice signal subjected to simple conversion using first formant through third formant.

In the case of recognizing an input voice signal by a voice recognition apparatus of the phoneme recognition system, the input voice signal is frequency-analyzed by a feature extracting device to extract several feature variables of phonemes relating to the recognized object in advance. These plural feature variables of phoneme are stored in a storage section as reference patterns for the respective phonemes. Then, each of words is expressed by a series of such phoneme reference patterns, and the resulting series of phoneme reference patterns are stored in a storage device in association with phoneme series of words using word-by-word for being stocked as a word dictionary. On the other hand, when an unknown voice is input, the aforesaid feature extracting device extracts feature variables from the input voice for each frame in a like manner as mentioned above. A check is then made to similarity between the extracted feature variables of the unknown voice for each frame and the phoneme reference patterns stored in the storage section. As a result, the phoneme corresponding to the phoneme reference pattern with the maximum similarity is determined as a phoneme of that frame. Likewise, phonemes of subsequent frames are determined successively to express the unknown voice as a series of phonemes. Afterward, a check is made to similarity between the phoneme series obtained from the unknown voice and the series of phoneme reference patterns for respective words in the word dictionary which are stored in the storage section. As a result, the word corresponding to the series of phoneme reference patterns with the maximum similarity is determined as a word of the input voice.

In acoustic analysis and feature extraction, a voice can be expressed with a less number of parameters through the linear prediction analysis (LPC) by supposing the voice to be an all-polar model. There has been proposed an attempt to utilize such a model approach to directly express the structure of articulatory organs and motional characteristics thereof, thereby effectively describing vocal tract functions cross-section area with the aid of a model. This is called an articulartory model using an articulatory parameter x (Shirai and Honda: "Estimation of Articulatory Parameters from Speech Waves", Trans. IECE Japan, 61-A, 5, pp. 409–416, 1978). The articulatory parameter x composed of an opening/closing angle of the lower jaw: $X(J)$, an antero-posterior (longitudinal) deformation of the tongue surface: $X(T1)$, a vertical deformation of the tongue: $X(T2)$, an opening area/extension of the lip: $X(L)$, a shape of glottis: $X(G)$, and an opening of the velum (degree of nasalization): $X(N)$. Thus, the articulatory parameter can be expressed by: $x = [X(T1), X(T2), X(J), X(L), X(G), X(N)]$. Assuming that a non-linear articulatory model for converting the articulatory parameter x to an acoustic parameter is given, the articulatory parameter x can be derived by solving the non-linear optimization problem from the acoustic parameter in a reversed manner. While the number of parameter dimensions is normally 12–20 in the aforementioned LPC, the number of dimensions for the articulatory parameter x is 6. This means that in the case of using the articulatory parameter x, information is compressed down to a half or less level compared with the LPC parameter.

Meanwhile, a narrow degree C at a point of articulation in the vocal tract has difficulties to express with high accuracy using the articulatory parameter x, but it is deeply related to the types of articulation such as vowel, fricative and closure. For the reason, the narrow degree is extracted separately from the articulatory parameter x and the coordinates (x, y) of a narrowed position so that it is utilized for voice recognition and the like. Further, both of the narrow degree C and the vector (x, y) of the narrowed position can be calculated simply from the acoustic parameter by using a neural network, while avoiding the non-linear optimization problem in the tone parameter x.

However, the above-mentioned conventional voice recognition apparatus has problems as follows. In the method based on the phoneme reference patterns, the feature variable of the phoneme extracted by the feature extracting device may be different depending on not only a physiological difference (e.g., a length difference in the vocal tract) between individual speakers but also an influence of articulatory coupling in the successive phonemic environment in the case of vowel(s) in a word, even if the voice is produced to express a phoneme symbol of the same representation. Stated otherwise, if voice recognition is made using the feature variable of phoneme, even the voice produced to express the same phoneme symbol may be determined as a different phoneme, whereby it is rejected or incorrectly recognized. Accordingly, high recognition ability cannot be obtained. This problem is attributable to the fact that voice recognition is performed using the feature variables of phonemes which may be fluctuated dependent on speakers and phonemic environment.

Speaker independent word recognition has a problem, as mentioned above, that an amount of calculations necessary for matching between the feature patterns of an input voice and the reference patterns is increased.

Further, the method of predicting an articulatory parameter from an acoustic parameter using an articulatory model is also problematic that the non-linear optimization problem must be solved, which is disadvantageous in amount of calculations and stability of convergence. To avoid this problem, there have been attempted several methods such as taking into account a fluctuation range and continuity of the parameter, utilizing a table lookup, etc. However, an amount of calculations remains essentially large. Another problem is in that the articulatory parameter x is directed to specified speakers and prediction can be well succeeded only in a vowel steady portion.

There have also been proposed various methods using formant frequencies to be adapted for many and unspecified speakers. But, no decisive method has been found.

SUMMARY OF THE INVENTION

An object of this invention is to provide a voice recognition apparatus which can extract a position of articulation (i.e., a narrowed position formed in a vocal tract) as a feature variable specific to phonation of a voice, which position is not dependent on speakers and languages.

Another object of this invention is to provide a voice recognition apparatus in which when making speaker independent voice recognition, feature variables of smaller dimensions capable of removing voice fluctuations caused by and dependent on a physiological difference between individual speakers are set by further developing feature variables of the narrow degree C and the coordinates (x, y) of a point of articulation, thereby to reduce the number of reference patterns and an amount of calculations necessary for matching by using the feature variables thus set.

The object of the invention can be achieved by a voice recognition apparatus for analyzing frequencies of an input voice inputted from a input device, for extracting feature variables of the input voice from the analyzed frequencies to recognize the input voice, the apparatus includes:

an unit for analyzing frequencies of the input voice;

an unit coupled to the analyzing unit for determining a vowel and a consonant zone of the analyzed input voice; and an unit for determining a position of articulation of a member of the input voice determined as a vowel zone by calculating from frequency components of the input voice in accordance with a predetermined algorithm based on frequency components of monophthongs having known phonation contents and position of articulation.

Preferably, the vowel position of articulation determining unit has a neural network capable of self-producing rules by learning processes using the error back propagation method, the position of articulation of vowel is calculated from the frequency components of the member in accordance with the rules.

The vowel position of articulation determining unit further has a storage unit for storing transform equations used for the algorithm so as to calculate the vowel position of articulation.

The recognition apparatus may further includes an unit coupled to the vowel/consonant zone determining unit for comparing the input voice determined as a consonant zone with memorized consonant patterns so as to make matching of consonants.

Preferably, the comparing unit includes a storage unit for storing the consonant patterns.

The voice recognition apparatus may further include an unit coupled to the determining unit for discriminating the determined input voice outputted from the determining unit by comparing with stored reference patterns therein.

The discriminating unit preferably include a matching unit coupled to the determining unit for comparing the input voice outputted from the determining unit with memorized reference patterns therein so as to calculate similarity therebetween, and a display unit for displaying the calculated similarity obtained by the matching unit.

The analyzing unit is preferably formed of either a group of band pass filter or a high-speed Fourier transformer.

In a voice feature extracting system of the first invention, a vowel/consonant zone determining device and a position of articulation extracting device are provided. Based on frequency components of a plurality of monophthongs whose phonation contents and positions of articulation are known, the input phonation content determined by the vowel/consonant zone determining device as a vowel zone is processed by the position of articulation extracting device to calculate a position of articulation of the vowel in problem from frequency components thereof. This allows to derive the position of articulation as a feature variable of the voice independent of speakers and languages. In accordance with the present invention, therefore, the position of articulation can be extracted through the simple processing with high accuracy.

Alternatively, a vowel/consonant zone determining device and a position of articulation extracting device which includes a neural network are provided. Based on frequency characteristics of the zones which have been determined by the vowel/consonant zone determining device as vowel zones, the neural network creates by itself rules to derive positions of articulation of vowels, through learning. In accordance with those rules, a position of articulation of an input vowel is derived by the position of articulation extracting device from frequency components in the zone determined as a vowel zone. This allows to derive the position of articulation as a feature variable of the voice independent of speakers and languages, based on the frequency components of the vowel. With the present invention, therefore, the position of articulation can be extracted through the simple processing with high accuracy.

The another object of the invention can be achieved by a voice recognition apparatus for analyzing frequencies of an input voice inputted from a input device, for determining feature variables of the input voice from the analyzed frequencies to recognize the input voice, and for indicating the recognized input voice, the apparatus includes:

an unit for analyzing frequencies of the input voice so as to derive acoustic parameters from the input voice;

a pattern converting unit coupled to the analyzing unit and having a neural network for converting the acoustic parameters to articulatory vectors, the neural network capable of learning by the error back propagation method using target data produced by a predetermined sequence based on the acoustic parameters so as to create rules in order to convert the acoustic parameters of the input voice to the articulatory vector having at least two vector elements.

a recognizing unit coupled to the pattern converting unit for recognizing the input voice by comparing a feature pattern of the analyzed input voice having the articulatory vector with reference patterns in predetermined sequence; and a storage unit coupled to the recognizing unit for storing the reference patterns having the articulatory vectors created by the pattern converting unit.

Preferably, the two vector elements are selected from among respective positions of a point of articulation in an antero-posterior and vertical directions, a degree of narrowness of a vocal tract at the point of articulation, presence or absence of vibrations of a vocal cords, a degree of nasalization, and a rounded degree.

Furthermore, the pattern converting unit is to convert the acoustic parameters to the articulatory vector by frame.

The neural network is preferably a multi-layered perceptron.

The voice recognition further includes an unit coupled to the recognizing unit for displaying similarity between the analyzed input voice and the reference patterns obtained by the recognizing unit.

Preferably, the storage unit is to memorize the reference patterns each of which has a time series of the articulatory vector created by the pattern converting unit for an acoustic sample.

Furthermore, the recognizing unit includes a preliminary selecting unit coupled to the pattern converting unit for selecting patterns from the reference patterns, and a discriminating unit coupled to the preliminary selecting unit for discriminating the input voice vector in accordance with a distance between respective time series of the articulatory vectors for the feature pattern and the reference pattern.

The analyzing unit preferably is formed of either a group of band pass filter or a fast Fourier transformer.

In a voice recognition system of a second invention, an acoustic parameter is first derived from an input voice signal by an acoustic analyzing device. From this acoustic parameter of the input voice, an articulatory vector is then produced which includes as its element at least two among antero-posterior/vertical positions of a point of articulation, a narrow degree of a vocal tract, presence or absence of vibrations of the vocal cords, a degree of nasalization, and a rounded degree (or degree of labilaization). A feature pattern of the input voice represented by a time series of the above articulatory vector and a reference pattern of a voice sample represented by a time series of the articulatory vector thereof are subjected to matching in a discriminating section by using a distance between those two time series of the articulatory vectors. Therefore, by expressing a voice by the articulatory vector, it becomes possible to eliminate voice fluctuations caused by a physiological difference between individual speakers, and to reduce the number of templates for the reference patterns, thereby reducing an amount of calculations necessary for matching, when voice recognition is made to many and unspecified speakers.

When producing the above articulatory vector, a parameter converting device makes learning with the error back propagation method by using target data which has been formed in advance through a predetermined sequence, so that the acoustic parameter of the input voice is converted to the articulatory vector by a neural network which has by itself created rules for converting the acoustic parameter of the input voice to the articulatory vector. Therefore, the articulatory vector can be produced through only simple operations of multiplication/summation, and an amount of calculations required for producing the articulatory vector can be reduced. In addition, by making learning of the neural network using the target data which has been obtained from voice samples of many speakers, the articulatory vector can stably be produced for all sorts of input voices.

Further objects and advantages of the present invention will be apparent from the following description, reference being had to the accompanying drawings wherein preferred embodiments of the present invention are clearly shown.

BRIEF DESCRIPTION OF THE DRAWINGS

FIG. 11 is an illustration for explaining the structure of a neural network;

FIG. 12 is a block diagram showing another embodiment of a voice recognition apparatus according to the present invention;

FIG. 13a is a chart showing one example of the waveform of an input voice;

FIG. 13b is a chart showing a time series of phoneme symbols corresponding to the voice waveform FIG. 13a;

FIG. 13c is a chart showing a time series of an element C of the articulatory vector corresponding to the voice waveform FIG. 13a;

FIG. 13d is a group of charts showing time series of elements x, y, n, g and l of the articulatory vector corresponding to the voice waveform FIG. 13a;

FIG. 14 is an illustration showing a neural network;

FIG. 15a is a sectional view of the mouth (or oral cavity) of a human being for explaining points of articulation of consonants; and FIG. 15b is a view showing values of the element x for consonants corresponding to points of articulation in the section of the mouth shown in FIG. 15a.

DESCRIPTION OF THE PREFERRED EMBODIMENTS

Hereinafter, the invention will be described in detail with reference to the illustrated embodiments.

Figure 1:
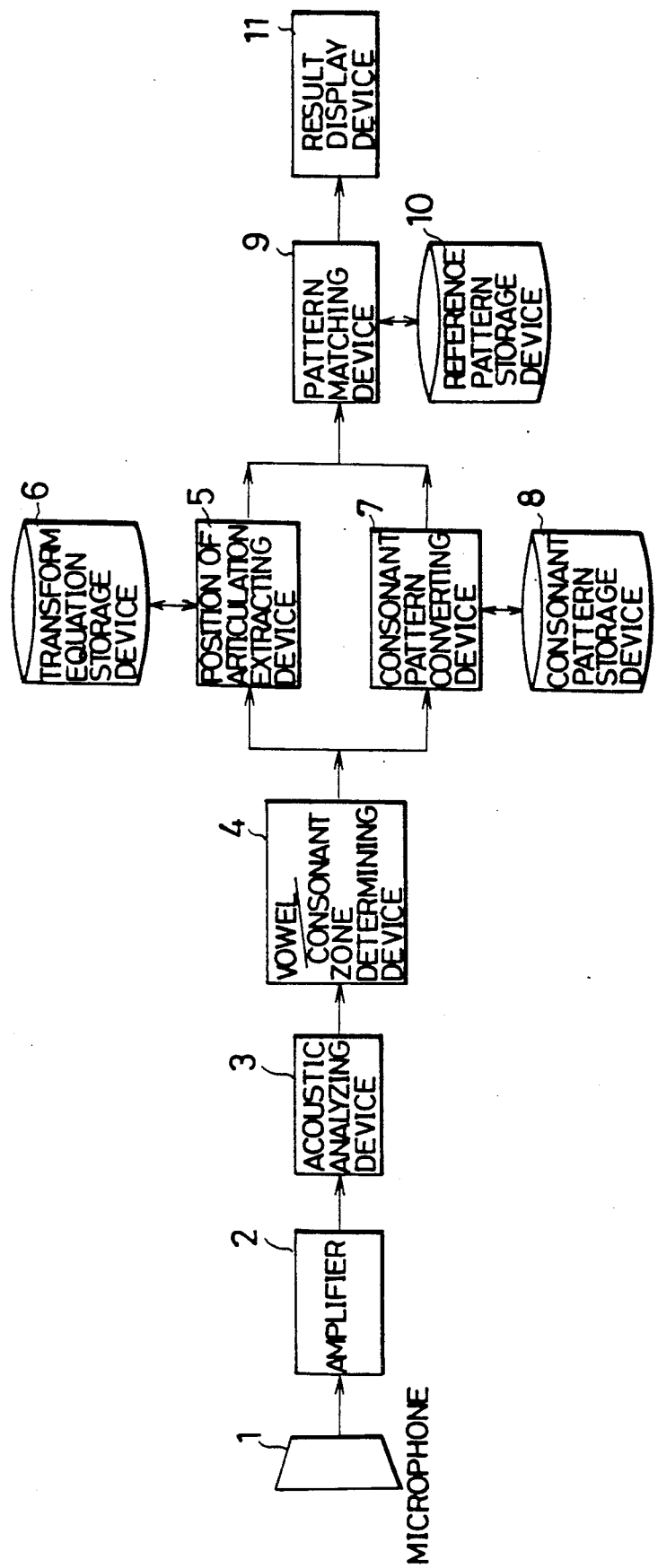
FIG. 1 is a block diagram of one embodiment of a voice recognition apparatus according to this invention.

FIG. 1 is a block diagram of a voice recognition apparatus according to a first invention. A voice signal input from a microphone 1 is amplified by an amplifier 2 and applied to an acoustic analyzing device 3. The acoustic analyzing device 3 performs frequency analysis of the input voice signal through a group of band-pass filters (hereinafter referred to as BPF) or fast Fourier transform (made for values obtained by multiplying the data of voice waveform by a window).

A vowel/consonant zone determining device 4 determines whether the input voice signal is a vowel zone or a consonant zone. This determination of vowel zone or consonant zone is carried out by referring changes in power and spectra of the input voice, or the like. If the input voice is determined as a vowel zone, a position of articulation of the vowel is extracted by a position of articulation extracting device 5. This extraction of the position of articulation of the vowel is carried out by reading transform equations and rules necessary for calculating the position of articulation from frequency components of the voice from a transform equation storage device 6, and then employing those transform equations and rules thus read in. On the other hand, if the input voice is determined as a consonant zone by the vowel/consonant zone determining device 4, matching between frequency components of the consonant zone and consonant patterns stored in a consonant pattern storage device 8 is made in a consonant pattern converting device 7 to output a candidate of the consonant pattern. In this manner, the input voice is converted to time series of the position of articulation of the vowels and the consonant patterns.

A pattern matching device 9 calculates similarity between the time series of the position of articulation of the vowels and the consonant patterns derived from the input voice as mentioned above and each of reference patterns for words derived by the similar method as mentioned above for respective known words and stored in reference pattern storage device 10. Based on the result of similarity calculation, the word is recognized and the recognition result is indicated on a result display section 11.

A first embodiment of the first invention will be described below in detail.

Figure 2:
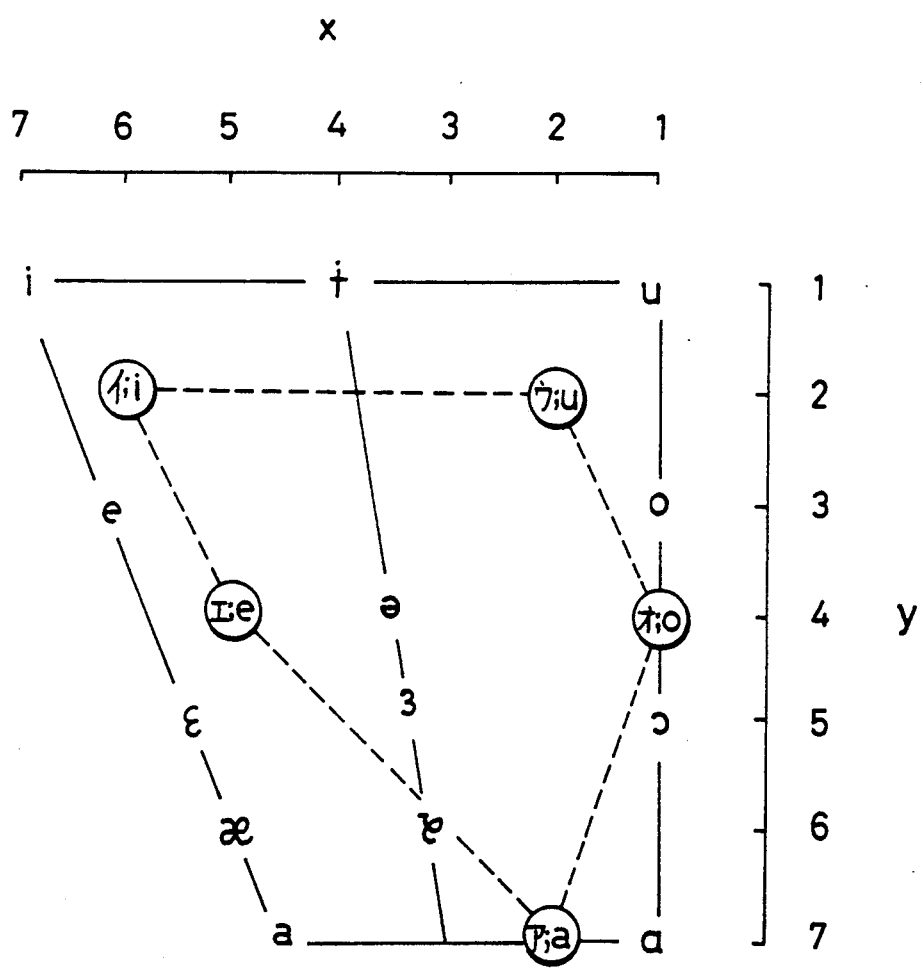
FIG. 2 is a representation showing positions of articulation of various vowels.

This embodiment is concerned with the position of articulation extracting device 5 for vowels, which calculates positions of articulation of vowels in a word from frequency components of the voice in accordance with predetermined algorithm, based on frequency components of monophthongs whose phonation contents and positions of articulation are known. In this embodiment, Japanese vowels (/ ;a/, / ;i/, / ;u/, / ;e/, / ;o/) are used as monophthongs whose positions of articulation are known. FIG. 2 is a representation showing positions of articulation of various vowels. In the FIG. 2, x represents position of articulation in an antero-posterior (longitudinal) direction, with the larger value being nearer to the anterior (front) end. Also, y represents the position of articulation in a vertical direction, with the larger value being nearer to the lower side. In FIG. 2, a Katakana notation encircled by indicates each of the aforesaid Japanese vowels. The toning position is now represented by the coordinates (x, y) within the following range:

$$1 \leq x \leq 7, 1 \leq y \leq 7$$

where x, y: integers

In this embodiment, it is assumed that each position of articulation is located on a lattice point of the coordinates. This is reasonable from the standpoint of auditory accuracy of a human being. Specifically, it is here assumed that the monophthong / ;a/ has a position of articulation (2, 7), the monophthong / ;i/ has a position of articulation (6, 2), the monophthong / ;u/ has a position of articulation (2, 2), the monophthong / ;e/ has a position of articulation (5, 4), and the monophthong / ;o/ has a position of articulation (1, 4). Based on the positions of articulation of the monophthongs thus set, positions of articulation of vowels in a word are each expressed by the coordinates (x, y).

Figure 3:
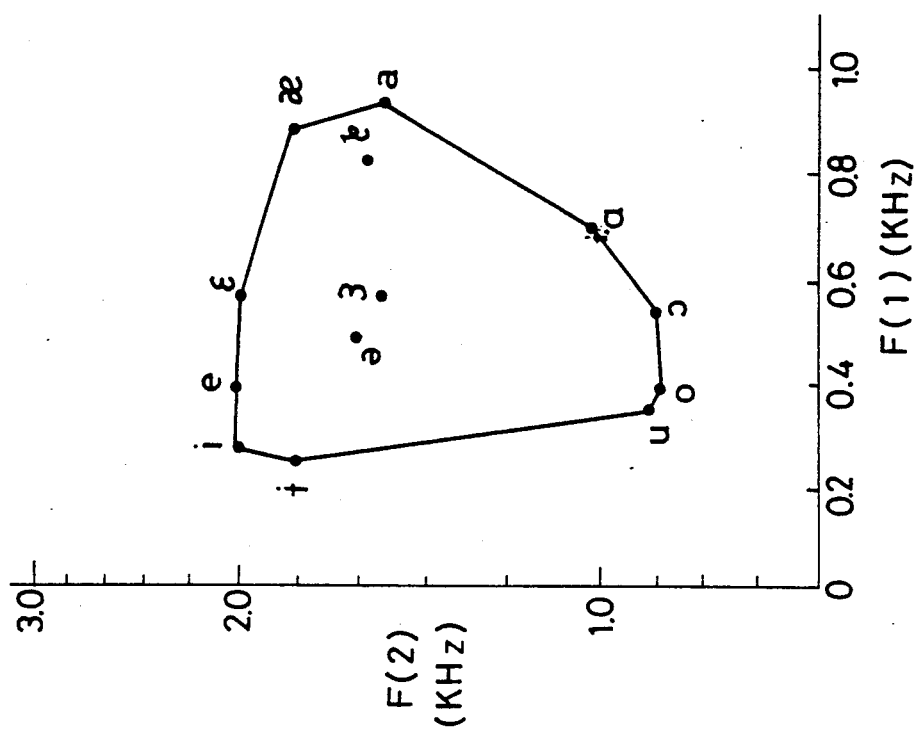
FIG. 3 is a representation showing the relationship between a first formant frequency and a second formant frequency for Japanese vowels.
Figure 4:
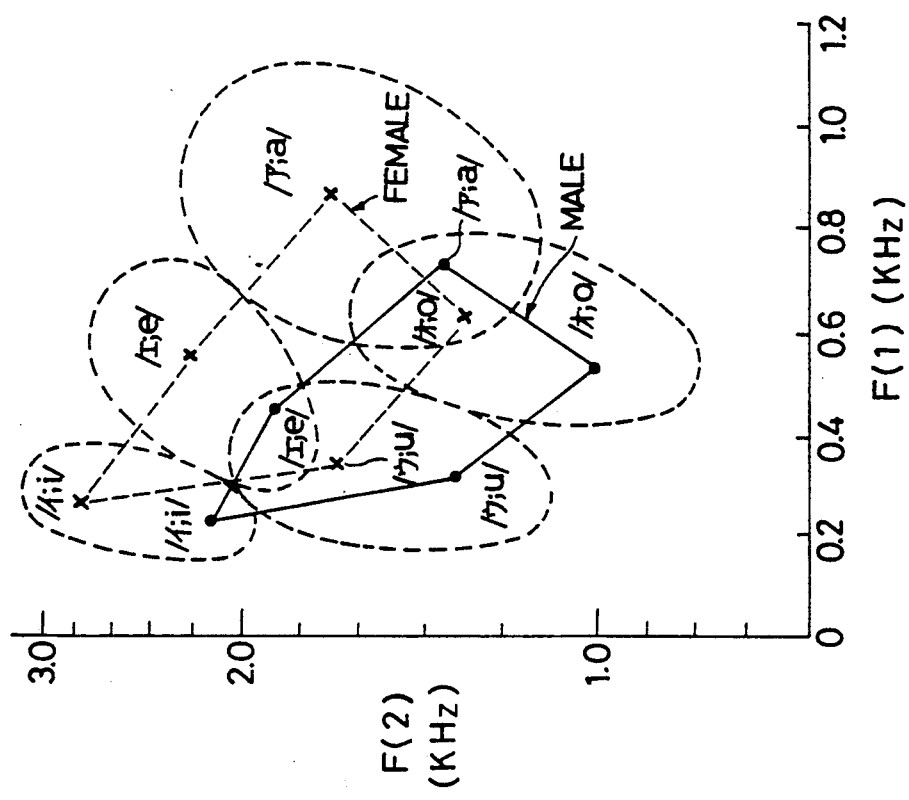
FIG. 4 is a representation showing the relationship between a first formant frequency and a second formant frequency for other various vowels phonated by some speaker.

The relationship between positions of articulation of vowels and frequency components of vowels phonated at those positions of articulation will now be described. FIG. 3 is a representation which indicates respective ranges of a first formant frequency (hereinafter expressed by F(1)) and a second formant frequency (hereinafter expressed by F(2)) of the Japanese vowels shown in FIG. 2 for males and females. FIG. 4 is a representation showing the relationship between F(1) and F(2) for various vowels other than the Japanese vowels, which are phonated by a specific speaker. From FIGS. 2, 3 and 4, it is found that the relationship between the formant frequencies and the positions of articulation is generally given by proportional relations between F(1) and y and between F(2) and x. For some vowels (/ ;i/ and / ;e/), the values of x, y are affected upon an increase and decrease in a third formant frequency (hereinafter expressed by F(3)). Based on those relationships, positions of articulation of vowels in a word are predicted from frequency components of the vowels in the word.

Next, a method of predicting positions of articulation of vowels in a word will be explained in more detail.

As described in connection with FIG. 1, the waveform of an input voice is previously sectioned into vowel zones and consonant zones for being labeled by the acoustic analyzing device 3 and the vowel/consonant zone determining device 4, and also subjected to acoustic analysis to extract formant frequencies. In this embodiment, the formant frequencies of the phoneme zones thus labeled as vowels are used for prediction.

Figure 5:
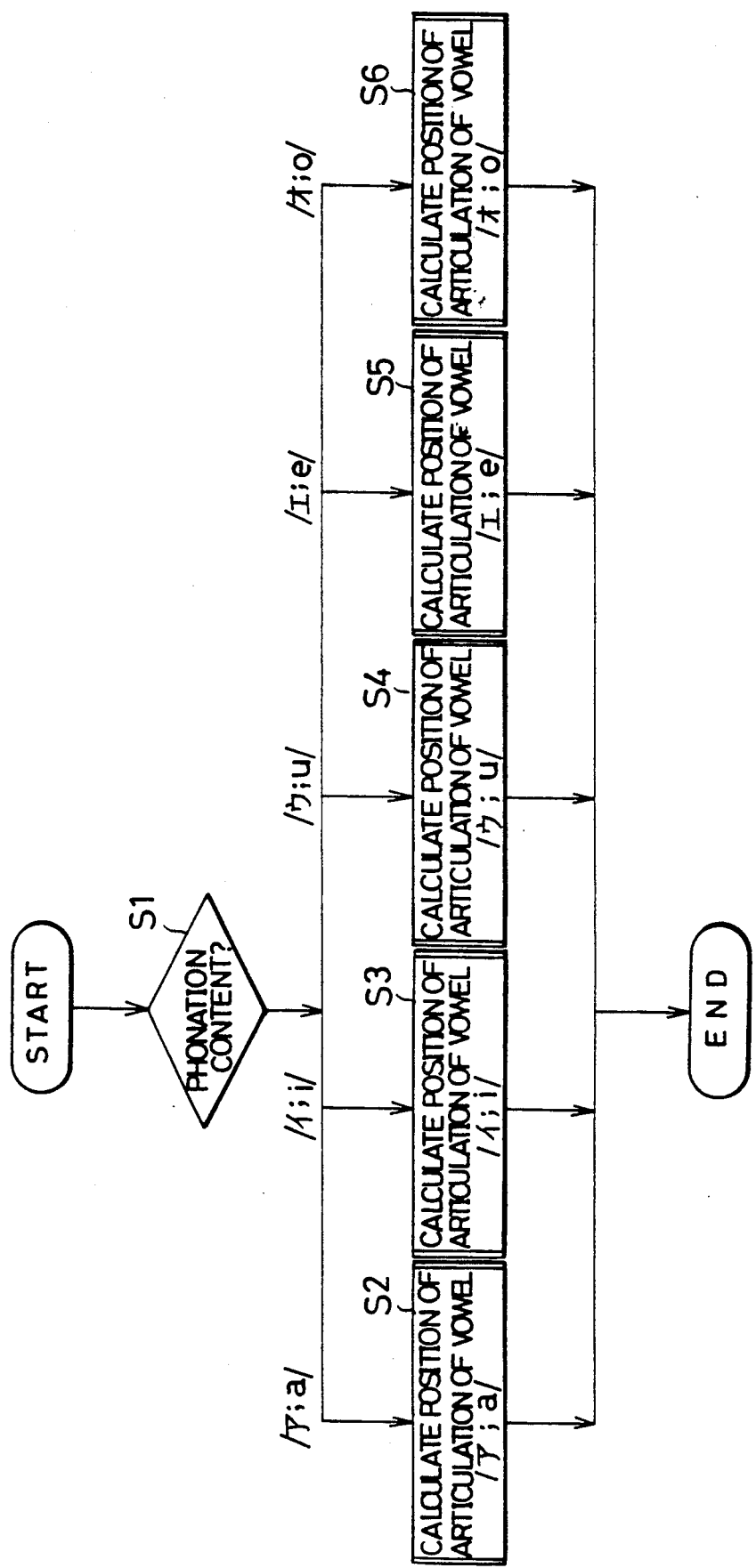
FIG. 5 is a flowchart of the position of articulation calculating operation of one vowel in a word.

FIG. 5 is a flowchart of the position of articulation calculating operation of one vowel in a word to be executed in the position of articulation extracting device 5 of FIG. 1.

In step S1, the formant frequencies of the zone determined by the vowel/consonant zone determining device 4 as a vowel zone are input and the kind of label (i.e., the phonation content) which is added to the formant frequencies of the input vowel zone is determined. In accordance with the label determined, the process goes to any one of steps S2, S3, S4, S5 and S6.

In step S2, a position of articulation calculating routine for a vowel / ;a/, described later in detail, is executed to complete the position of articulation calculating operation for one vowel.

In step S3, a position of articulation calculating routine for a vowel / ;i/, described later in detail, is executed to complete the position of articulation calculating operation for one vowel.

In step S4, a position of articulation calculating routine for a vowel / ;u/, described later in detail, is executed to complete the position of articulation calculating operation for one vowel.

In step S5, a position of articulation calculating routine for a vowel / ;e/, described later in detail, is executed to complete the position of articulation calculating operation for one vowel.

In step S6, a position of articulation calculating routine for a vowel / ;o/, described later in detail, is executed to complete the position of articulation calculating operation for one vowel.

The position of articulation calculating routines for respective vowels executed in steps S2 to step S6 will be explained below in more detail. (A) Position of Articulation Calculating Routine for Vowel / ;a/

In the vicinity of the position of articulation of the monophthong, F(1) and F(2) are varied non-linearly upon changes in the position of articulation. Therefore, a table for directly converting the values of F(1), F(2) of the vowel / ;a/ in the word to a position of articulation (hereinafter referred to as a conversion table) is prepared (one example shown in the following Table 1) and stored in the transform equation storage device 6.

TABLE 1

| x | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| | | | | | | | J | | | | | | | | | |
| 1 | 23 | 23 | 24 | 24 | 24 | 25 | 25 | 26 | 26 | 27 | 27 | 27 | 27 | 28 | 28 | 28 |
| 2 | 23 | 23 | 24 | 24 | 24 | 25 | 25 | 26 | 26 | 27 | 27 | 27 | 27 | 28 | 28 | 28 |
| 3 | 30 | 30 | 24 | 24 | 24 | 25 | 25 | 26 | 26 | 27 | 27 | 27 | 27 | 28 | 28 | 28 |
| 4 | 30 | 30 | 31 | 31 | 31 | 32 | 32 | 33 | 33 | 34 | 34 | 34 | 34 | 35 | 35 | 28 |
| 5 | 30 | 30 | 31 | 31 | 31 | 32 | 32 | 33 | 33 | 34 | 34 | 34 | 34 | 35 | 35 | 35 |
| 6 | 30 | 30 | 31 | 31 | 31 | 39 | 39 | 40 | 40 | 40 | 41 | 41 | 41 | 42 | 35 | 35 |
| 7 | 30 | 30 | 38 | 38 | 38 | 39 | 39 | 40 | 40 | 41 | 41 | 41 | 41 | 42 | 42 | 35 |
| 8 | 37 | 37 | 38 | 38 | 38 | 39 | 39 | 40 | 40 | 48 | 48 | 48 | 42 | 42 | 42 | 35 |
| 9 | 37 | 37 | 38 | 38 | 38 | 38 | 39 | 40 | 47 | 47 | 48 | 48 | 42 | 42 | 42 | 42 |
| 10 | 37 | 37 | 38 | 38 | 38 | 38 | 39 | 47 | 47 | 47 | 48 | 48 | 48 | 49 | 49 | 42 |
| 11 | 45 | 45 | 45 | 45 | 45 | 45 | 45 | 46 | 47 | 47 | 48 | 48 | 48 | 48 | 49 | 49 |
| 12 | 45 | 45 | 45 | 45 | 45 | 45 | 45 | 46 | 47 | 47 | 48 | 48 | 48 | 48 | 49 | 49 |

This conversion table was prepared by asking many speakers to produce voices at various positions of articulation, and then considering the relationship between the positions of articulation and the formant frequencies. The coordinates of the monophthongs on the conversion table (hereinafter referred to as table positions) are expressed by (I, J) as follows. The table position of the monophthong / ;a/ is given by (8, 11), the table position of the monophthong / ;e/ is given by (2, 4), and the table position of the monophthong / ;o/ is given by (2, 15). I is increased and decreased upon an increase and decrease in F(1) (i.e., upon an increase and decrease in y), while J is increased and decreased upon an increase and decrease in F(2) (i.e., upon an increase and decrease in x).

The positions of articulation of vowels in a word are calculated from F(1), F(2) thereof using the above conversion table in a manner below. When F(2) of the vowel / ;a/ in the word is higher than F(2) of the monophthong / ;a/, the former's position of articulation is shifted toward the position of articulation of the monophthong / ;e/. Accordingly, F(1) of the vowel / ;a/ in the word is normalized from F(1) of the monophthong / ;a/ and F(1) of the monophthong / ;e/ to derive I of the table position (I, J) of the vowel / ;a/ in the word. Then, F(2) of the vowel / ;a/ in the word is normalized from F(2) of the monophthong / ;a/ and F(2) of the monophthong / ;e/ to derive J of the table position (I, J) of the vowel / ;a/ in the word. The table position (I, J) of the vowel / ;a/ in the word is thus calculated. When F(2) of the vowel / ;a/ in the word is lower than F(2) of the monophthong / ;a/, the former's position of articulation is shifted toward the position of articulation of the monophthong / ;o/. Accordingly, F(1) of the vowel / ;a/ in the word is normalized from F(1) of the monophthong / ;a/ and F(1) of the monophthong / ;o/ to derive I of the table position (I, J) of the vowel / ;a/ in the word. Then, F(2) of the vowel / ;a/ in the word is normalized from F(2) of the monophthong / ;a/ and F(2) of the monophthong / ;o/ to derive J of the table position (I, J) of the vowel / ;a/ in the word. The table position (I, J) of the vowel / ;a/ in the word is thus calculated.

Afterward, the values of the thus-calculated table positions (I, J) on the conversion table (hereinafter referred to as TABLE (I, J)) are derived from the conversion table. Based on the TABLE (I, J) derived from the conversion table, the position of articulation (x, y) of the vowel / ;a/ in the word using the relative equation (1) between the TABLE (I, J) and the position of articulation (x, y) below:

$$\left.\begin{array}{l} y = [(\text{TABLE}\,(I,\,J) - 1)/7] + 1 \\ x = 7 \times y - \text{TABLE}\,(I,\,J) + 1 \end{array}\right\} \quad (1)$$

where [N] is a maximum integer not exceeding N, N = [TABLE (I, J) − 1)/7].

Figure 6:
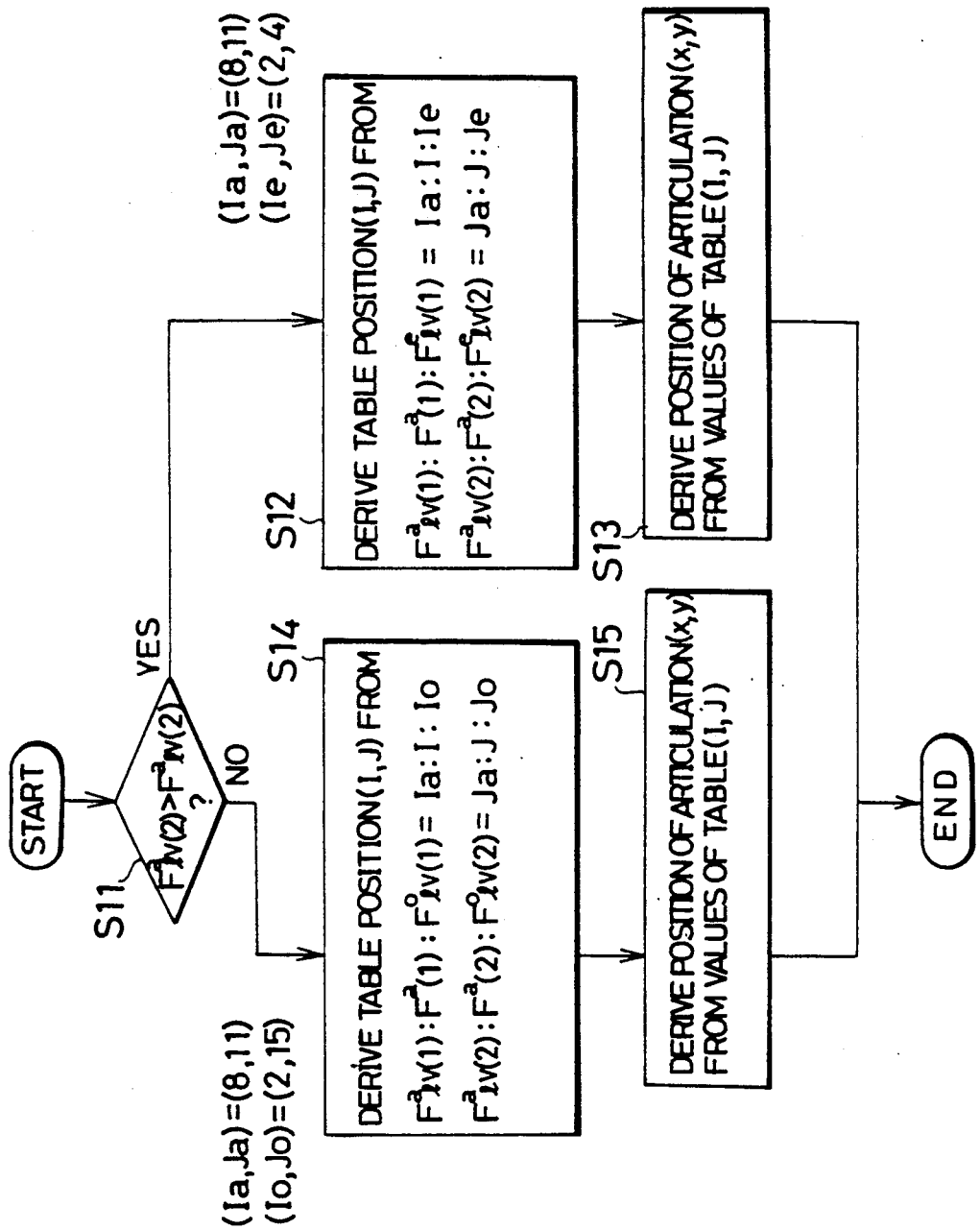
FIG. 6 is a flowchart of a position of articulation calculating routine for a vowel / [a]/ in the word of FIG. 5.

FIG. 6 is a flowchart of a position of articulation calculating routine for a vowel / ;a/ in the word employed in the flowchart of FIG. 5. Those variables which are used in the following explanation of the toning position calculating routines for respective vowels are defined below:

$F^V(n)$ (V = a, i, u, e, o, n = 1, 2, 3) . . . n-th formant frequency of a vowel V in the word $F^V_{/V/}(n)$ (V = a, i, u, e, o, n = 1, 2, 3) . . . n-th formant frequency of a monophthong V (I, J) (V=a, i, u, e, o) . . . table postion of the vowel V in the word ($I_V$, $J_V$) (V=a, i, u, e, o) . . . table position of the monophthong V The position of articulation calculating routine for a vowel / ;a/ in the word will be described below in more detail with reference to FIG. 6.

Step S11 determines whether or not $F^a(2)$ is higher than $F^a_{IV}(2)$. If $F^a(2)$ is higher than $F^a_{IV}(2)$, the process goes to step S12. If not so, it goes to step S14.

In step S12, I is calculated by putting $F^a_{IV}(1)$, $F^a(1)$, $F^e_{IV}(1)$, $I_a$ and $I_e$ into $F^a_{IV}(1)$: $F^a(1):F^e_{IV}(1)=I_a:I:I_e$. Also, J is calculated by putting $F^a_{IV}(2)$, $F^a(2)$, $F^e_{IV}(2)$, $J_a$ and $J_e$ into $F^a_{IV}(2):F^a(2):F^e_{IV}(2)=J_a:J:J_e$.

Here, $I_a=8$, $J_a=11$ are given from the table position (I, J)=(8, 11) of the monophthong / ;a/, and $I_e=2$, $J_e=4$ are given from the table position (I, J)=(2, 4) of the monophthong / ;e/. Further, the values extracted by the acoustic analyzing device 3 as mentioned above are used as values of $F^a_{IV}(1)$, $F^a_{IV}(2)$, $F^a(1)$, $F^a(2)$, $F^e_{IV}(1)$ and $F^e_{IV}(2)$.

In step S13, TABLE (I, J) is derived from the conversion table based on the table position (I, J) of the vowel / ;a/ in the word calculated in step S12. In accordance with TABLE (I, J) thus derived, the position of articulation (x, y) is calculated from the above equation (1), whereby the position of articulation calculating routine for a vowel / ;a/ in the word is completed.

In step S14, I is calculated from $F^a_{IV}(1):F^a(1):F^o_{IV}(1)=I_a:I:I_o$, and J is calculated from $F^a_{IV}(2):F^a(2):F^o_{IV}(2)=J_a:J:J_o$.

Here, $I_o=2$, $J_o=15$ are given from the table position (I, J)=(2, 15) of the monophtong / ;o/.

In step S15, TABLE (I, J) is derived from the conversion table based on the table position (I, J) of the vowel / ;a/ in the word calculated in step S14. In accordance with TABLE (I, J) thus derived, the position of articulation (x, y) is calculated from the above equation (1), whereby the position of articulation calculating routine for a vowel / ;a/ in the word is completed.

(B) Position of Articulation Calculating Routine for Vowel / ;i/

The vertical component of the position of articulation (i.e., y value) of a vowel / ;i/ is mainly determined by the level of F(1). Therefore, the y value of the position of articulation of a vowel / ;i/ in the word is decided as a result of comparison between a threshold "BNDIE1" and "BNDIE2", which are determined dependent on a value of F(1) of the monophthong / ;i/ and a value of F(1) of the monophthong / ;e/, and F(1) of the vowel / ;i/ in the word.

The antero-posterior component of the position of articulation (i.e., x value) of the vowel / ;i/ in the word is calculated in different manners dependent on the y value of the position of articulation decided as mentioned above. More specifically, in the case of $y \leq 2$, the toning position of the vowel / ;i/ in the word is shifted toward the position of articulation of the monophthong / ;u/. Since an increase and decrease in x, y values of the position of articulation of the monophthong / ;i/ are related to F(3), as explained above, x of the position of articulation is calculated dependent on the level of F(3). Thus, when the position of articulation of the vowel / ;i/ is continuously changed from the position of articulation of the monophthong / ;i/ to the position of articulation of the monophthong / ;u/, F(3) is lowered to approach F(2) so that F(3) is superposed over or comes very close to F(2) (during this time the value of F(2) remains substantially unchanged). Then, when the position of articulation is shifted toward the posterior side, it enters the region of a vowel / ;u/ where F(3) is not so changed, while F(2) is lowered to be depart away from F(3) again.

In the region of the vowel / ;i/ in the case of $y \leq 2$, the x value of the vowel / ;i/ in the word is calculated in accordance with the result of comparison between a threshold "BNDX", which is determined from a value of F(3) at the position of articulation x=jx (=5) when values of F(2), F(3) of the vowel / ;i/ are superposed to each other (hereinafter referred to as Fjx), and a value of F(3) of the vowel / ;i/ in the word.

On the other hand, in the case of y>2, the position of articulation of the vowel / ;i/ in the word is shifted toward the position of articulation of the monophthong / ;e/. At this time, when the position of articulation of the vowel / ;i/ is continuously changed from the position of articulation of the monophthong / ;i/ to the position of articulation of the monophthong / ;e/, F(2) is lowered, so does F(3). Therefore, by assuming that changes in F(2) and F(3) contribute to changes in the position of articulation of the vowel / ;i/ in the word at a ratio 2:1, the values of F(2), F(3) of the vowel / ;i/ in the word are normalized from the values of F(2), F(3) of the monophthong / ;i/, and the values of F(2), F(3) of the monophthong / ;e/, thereby to calculate x of the position of articulation of the vowel / ;i/ in the word.

Figure 7:
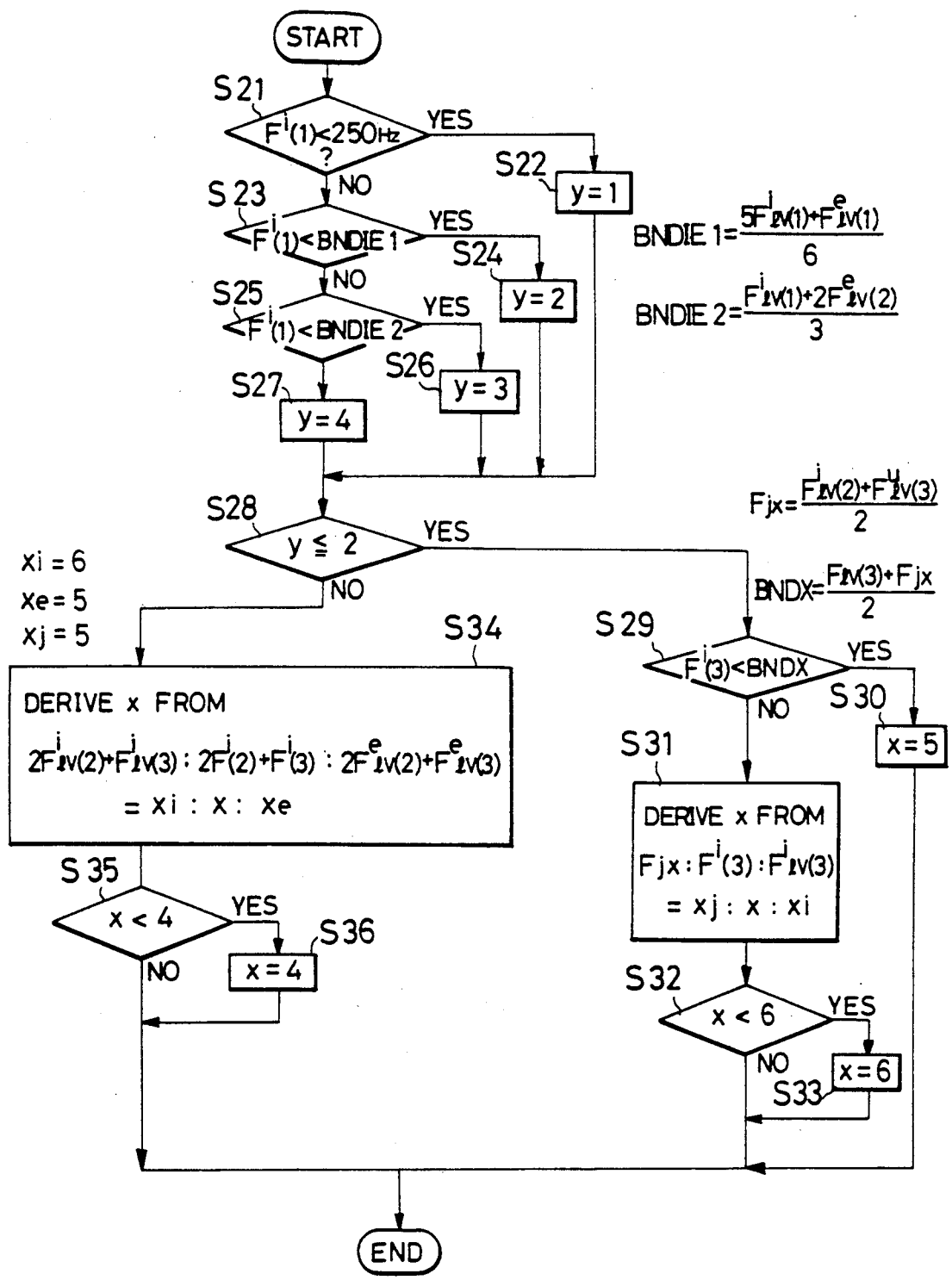
FIG. 7 is a flowchart of a position of articulation calculating routine for a vowel / [i]/ in the word of FIG. 5.

FIG. 7 is a flowchart of a position of articulation calculating routine for a vowel / ;i/ in the word employed in the flow-chart of FIG. 5. The position of articulation calculating routine for a vowel / ;i/ in the word will be described below in more detail with reference to FIG. 7.

Step S21 determines whether or not the value of $F^i(1)$ is smaller than 250 Hz. If the value of $F^i(1)$ is smaller than 250 Hz, the process goes to step S22. If not so, it goes to step S23.

In step S22, y of the position of articulation is set to be y=1, followed by proceeding to S28.

Step S23 determines whether or not the value of $F^i(1)$ is smaller than "BNDIE1". If the value of $F^i(1)$ is smaller than "BNDIE1", the process goes to step S24. If not so, it goes to step S25.

Here, the threshold "BNDIE1" is a value set as below:

$$BNDIE1 = (5F^i_{IV}(1) + F^e_{IV}(1))/6$$

In step S24, y of the position of articulation is set to be y=2, followed by proceeding to S28.

Step S25 determines whether or not the value of $F^i(1)$ is smaller than "BNDIE2". If the value of $F^i(1)$ is smaller than "BNDIE2", the process goes to step S26. If not so, it goes to step S27.

Here, the threshold "BNDIE2" is a value set as below:

$$BNDIE2 = (F^i_{IV}(1) + 2F^e_{IV}(1))/3$$

In step S26, y of the position of articulation is set to be y=3, followed by proceeding to step S28. In step 27, y of the position of articulation is set to be y=4, followed by proceeding to step 28.

Step S28 determines whether or not the y value of the position of articulation set in step S22, step S24, step S26 or step S27 is equal to or less than 2. If that y value is equal to or less than 2, the process goes to step S29. If not so, it goes to step S34.

Step S29 determines whether or not the value of $F^i(3)$ is smaller than "BNDX". If the value of $F^i(3)$ is smaller than "BNDX", the process goes to step S30. If not so, it goes to step S31.

Here, the threshold "BNDX" is a value set as below:

$$BNDX = (F^i_{IV}(3) + F_{jx})/2$$

$$F_{jx} = (F^i_{IV}(2) + F^u_{IV}(3))/2$$

In step S30, x of the position of articulation is set to be $x = 5$, whereby the position of articulation calculating routine for a vowel / ;i/ in the word is completed.

In step S31, x is derived from $F_{jx}$: $F^i(3)$: $F^i_{IV}(3) = x_j$: x : $x_i$.

Here, $x_i = 6$ is given from the position of articulation $(x, y) = (6, 2)$ of the monophthong / ;i/. Also, $x_j = 5$ is given from the position of articulation $x = x_j = 5$ at which F(2) and F(3) are superposed to each other when the position of articulation of the vowel / ;i/ is continuously changed from the position of articulation of the monophthong / ;i/ to the position of articulation of the monophthong / ;u/.

Step S32 determines whether or not the x value of the position of articulation calculated in above step S31 is smaller than 6. If that x value is smaller than 6, the process goes to step S33. If not so, the position of articulation calculating routine for a vowel / ;i/ in the word is completed.

In step S33, x of the position of articulation is set to be $x = 6$, whereby the position of articulation calculating routine for a vowel / ;i/ in the word is completed.

In step S34, x is calculated from $\{2 F^i_{IV}(2) + F^i_{IV}(3)\}$: $\{2 F^i(2)$: $F^i(3)\}$: $\{2 F^e_{IV}(2) + F^e_{IV}(3)\} = x_j$: x: $x_e$.

Here, $x_i = 6$ is given from the position of articulation $(x, y) = (6, 2)$ of the monophthong / ;i/, and $x_e = 5$ is given from the position of articulation $(x, y) = (5, 4)$ of the monophthong / ;e/.

Step S35 determines whether or not the x value of the position of articulation calculated in above step S34 is smaller than 4. If that x value is smaller than 4, the process goes to step S36. If not so, the position of articulation calculating routine for a vowel / ;i/ in the word is completed.

In step S36, x of the position of articulation is set to be $x = 4$, whereby the position of articulation calculating routine for a vowel / ;i/ in the word is completed.

(C) Position of Articulation Calculating Routine for Vowel / ;u/

The y value of the toning position of a vowel / ;u/ can be determined by the level of F(1). Specifically, in the case where F(1) of the vowel / ;u/ in the word is higher than F(1) of the monophthong / ;u/, since the position of articulation of the vowel / ;u/ in the word is shifted toward the position of articulation of the monophthong / ;o/, the value of F(1) of the vowel / ;u/ in the word is normalized from the value of F(1) of the monophthong / ;u/ and the value of F(1) of the monophthong / ;o/, thereby to calculate y of the position of articulation of the vowel / ;u/ in the word. Conversely, in the case where F(1) of the vowel / ;u/ in the word is lower than F(1) of the monophthong / ;u/, since the position of articulation of the vowel / ;u/ in the word is shifted toward the side of $y = 1$, the value of F(1) of the vowel / ;u/ in the word is normalized from the value of F(1) of the monophthong / ;u/ and the value of F(1) corresponding to $y = 1$, thereby to calculate y of the position of articulation of the vowel / ;u/ in the word.

On the other hand, the x value of the position of articulation of the vowel / ;u/ can be determined by the level of F(2). Specifically, in the case where F(2) of the vowel / ;u/ in the word is higher than F(2) of the monophthong / ;u/, since the position of articulation of the vowel / ;u/ in the word is shifted toward the position of articulation of the monophthong / ;i/, the value of F(2) of the vowel / ;u/ in the word is normalized from the value of F(2) of the monophthong / ;u/ and the value of $F(2) = F_{jx}$ at the aforesaid position of articulation $x = jx$ $(= 5)$, thereby to calculate x of the position of articulation of the vowel / ;u/ in the word. Conversely, in the case where F(2) of the vowel / ;u/ in the word is lower than F(2) of the monophthong / ;u/, since the position of articulation of the vowel / ;u/ in the word is shifted toward the position of articulation of the monophthong / ;o/, the value of F(2) of the vowel / ;u/ in the word is normalized from the value of F(2) of the monophthong / ;u/ and the value of the monophthong / ;o/, thereby to calculate x of the position of articulation of the vowel / ;u/ in the word.

Figure 8:
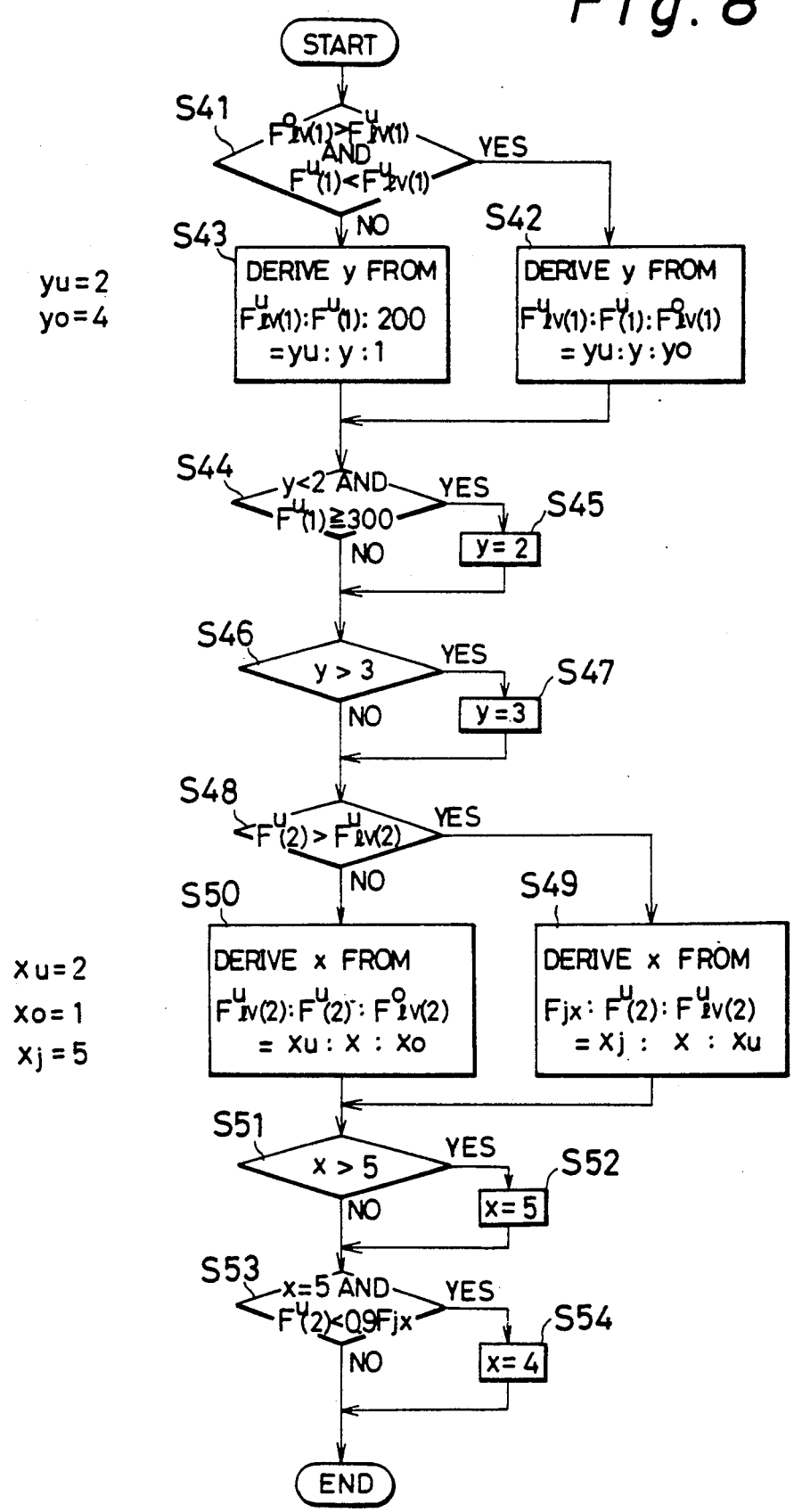
FIG. 8 is a flowchart of a position of articulation calculating routine for a vowel / [u]/ in the word of FIG. 5.

FIG. 8 is a flowchart of a position of articulation calculating routine for a vowel / ;u/ in the word employed in the flowchart of FIG. 5. The position of articulation calculating routine for a vowel / ;u/ in the word will be described below in more detail with reference to FIG. 8.

Step S41 determines whether or not the value of $F^o_{IV}(1)$ is larger than the value of $F^u_{IV}(1)$ and the value of $F^u(1)$ is larger than the value of $F^u_{IV}(1)$. If the value of $F^o_{IV}(1)$ is larger than the value of $F^u_{IV}(1)$ and the value of $F^u(1)$ is larger than the value of $F^u_{IV}(1)$, the process goes to step S42. If not so, it goes to step S43.

In step S42, y is calculated from $F^u_{IV}(1)$: $F^u(1)$: $F^o_{IV}(1) = y_u$: y: $y_o$.

Here, $y_u = 2$ is given from the position of articulation $(x, y) = (2, 2)$ of the monophthong / ;u/. Also, $y_o = 4$ is given from the position of articulation $(x, y) = (1, 4)$ of the monophthong / ;o/.

In step S43, y is calculated from $F^u_{IV}(1)$: $F^u(1)$: $200 = y_u$: y: 1.

Step S44 determines whether or not the y value of the position of articulation derived in above step S42 or step S43 is smaller than 2 and the value of $F^u(1)$ is equal to or greater than 300 Hz. If the y value of the position of articulation is smaller than 2 and the value of $F^u(1)$ is equal to or greater than 300 Hz, the process goes to step S45. If not so, it goes to step S46.

In step S45, the y value of the position of articulation is set to be $y = 2$, followed by proceeding to step S46.

Step S46 determines whether or not the y value of the position of articulation derived in above step S42 or step S43 is larger than 3. If the y value of the position of articulation is larger than 3, the process goes to step S47. If not so, it goes to step S48.

In step S47, the y value of the position of articulation is set to be $y = 3$, followed by proceeding to step S48.

Step S48 determines whether or not the value of $F^u(2)$ is larger than the value of $F^u_{IV}(2)$. If the value of $F^u(2)$ is larger than the value of $F^u_{IV}(2)$, the process goes to step S49. If not so, it goes to step S50.

In step S49, x is calculated from $F_{jx}$: $F^u(2)$: $F^u_{IV}(2) = x_j$: x: $x_u$.

Here, $x_u = 2$ is given from the position of articulation $(x, y) = (2, 2)$ of the monophthong / ;u/. Also, $x_j = 5$ is given from the position of articulation $x = x_j = 5$.

In step S50, x is calculated from $F^u_{IV}(2)$: $F^u(2)$: $F^o_{IV}(2) = x_u$: x: $x_o$.

Here, $x_o = 1$ is given from the position of articulation $(x, y) = (1, 4)$ of the monophthong / ;o/.

Step S51 determines whether or not the x value of the position of articulation derived in above step S49 or step S50 is larger than 5. If the x value of the position of articulation is larger than 5, the process goes to step S52. If not so, it goes to step S53.

In step S52, the x value of the position of articulation is set to be $x = 5$, followed by proceeding to step S53.

Step S53 determines whether or not the x value of the position of articulation derived in above step S49 or step S50 is equal to 5 ($x = 5$) and the value of $F^u(2)$ is smaller than $0.9 F_{jx}$. If $x = 5$ holds and the value of $F^u(2)$ is smaller than $0.9 F_{jx}$, the process goes to step S54. If not so, the position of articulation calculating routine for a vowel / ;u/ in the word is completed.

In step S54, the x value of the position of articulation is set to be $x = 4$, whereby the position of articulation calculating routine for a vowel / ;u/ in the word is completed. (D) Position of Articulation Calculating Routine for Vowel / ;e/

The routine for calculating the position of articulation of a vowel / ;e/ is different dependent on whether the position of articulation of the vowel / ;e/ is shifted toward the position of articulation of the monophthong / ;a/ or toward the position of articulation of the monophthong / ;i/. More specifically, if the value of $F(1)$ of the vowel / ;e/ in the word is larger than a threshold "BNDIE2" of $F(1)$ used for defining the boundary between two y values of the positions of articulation; $y = 3$ and $y = 4$ it is determined that the position of articulation of the vowel / ;e/ in the word is shifted toward the position of articulation of the monophthong / ;a/. Then, as described in the above Section (A), $F(1)$ of the vowel / ;e/ in the word is normalized from $F(1)$ of the monophthong / ;a/ and $F(1)$ of the monophthong / ;e/, and $F(2)$ of the vowel / ;e/ in the word is normalized from $F(2)$ of the monophthong / ;a/ and $F(2)$ of the monophthong / ;e/, thereby to calculate a table position (I, J) of the vowel / ;e/ in the word. Based on this table position (I, J), TABLE (I, J) is derived from the aforesaid conversion table, and the position of articulation (x, y) of the vowel / ;e/ in the word is calculated using the above Equation (1).

On the contrary, if the value of $F(1)$ of the vowel / ;e/ in the word is smaller than the threshold "BNDIE2", it is determined that the position of articulation of the vowel / ;e/ in the word is shifted toward the position of articulation of the monophthong / ;i/. In this case, the position of articulation of the vowel / ;e/ in the word is calculated by an algorithm similar to the position of articulation calculating algorithm (FIG. 7), as described in the above Section (B), effective when the position of articulation of the vowel / ;i/ in the word is shifted toward the position of articulation of the monophthong / ;e/. However, the algorithm in this case does not include the step of setting the y value of the position of articulation to be $y = 1$ and the step of calculating x if $y = 1$ holds.

Figure 9:
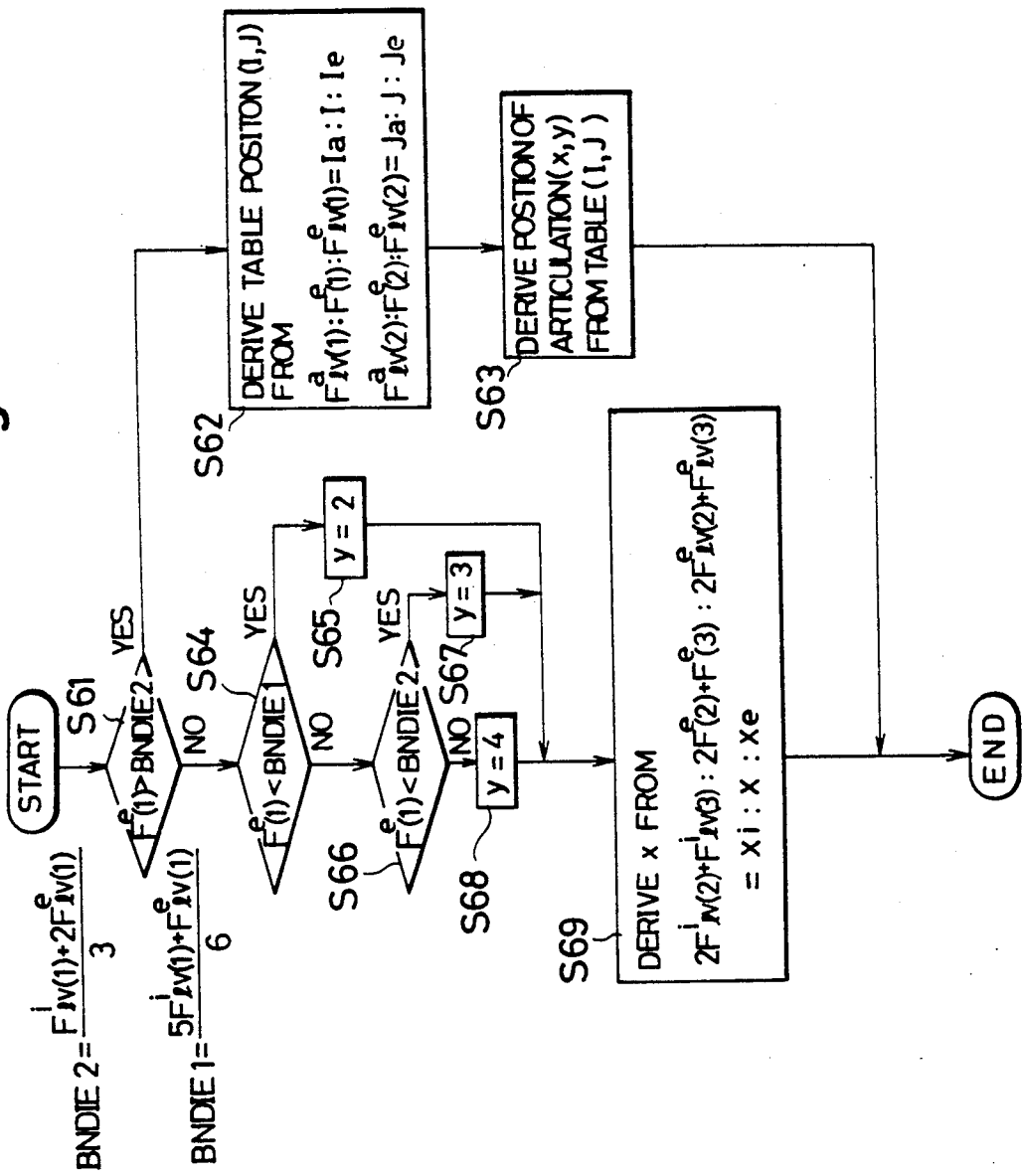
FIG. 9 is a flowchart of a position of articulation calculating routine for a vowel / [e]/ in the word of FIG. 5.

FIG. 9 is a flowchart of a position of articulation calculating routine for a vowel / ;e/ in the word employed in the flowchart of FIG. 5. The position of articulation calculating routine for a vowel / ;e/ in the word will be described below in more detail with reference to FIG. 9.

Step S61 determines whether or not the value of $F^e(1)$ is larger than the aforesaid threshold "BNDIE2". If the value of $F^e(1)$ is larger than "BNDIE2", the process goes to step S62. If not so, it goes to step S64.

In step S62, I is calculated from $F^a_{IV}(1):F^e(1):F^e_{IV}(1) = I_a:I:I_e$, and J is calculated from $F^a_{IV}(2):F^e(2):F^e_{IV}(2) = J_a:J:J_e$.

In step S63, TABLE (I, J) is derived from the aforesaid conversion table based on the table position (I, J) of the vowel / ;e/ in the word calculated in step S62. In accordance with TABLE (I, J) thus derived, the position of articulation (x, y) is calculated from the above equation (1), whereby the position of articulation calculating routine for a vowel / ;e/ in the word is completed.

Step S64 determines whether or not the value of $F^e(1)$ is smaller than the aforesaid threshold "BNDIE1". If the value of $F^e(1)$ is smaller than "BNDIE1", the process goes to step S65. If not so, it goes to step S66.

In step S65, the y value of the position of articulation is set to be $y = 2$, followed by proceeding to step S69.

Step S66 determines whether or not the value of $F^e(1)$ is smaller than the aforesaid threshold "BNDIE2". If the value of $F^e(1)$ is smaller than "BNDIE2", the process goes to step S67. If not so, it goes to step S68.

In step S67, the y value of the position of articulation is set to be $y = 3$, followed by proceeding to step S69.

In step S68, the y value of the position of articulation is set to be $y = 4$, followed by proceeding to step S69.

In step S69, x is calculated from $\{2\ F^i_{IV}(2) + F^i_{IV}(3)\}:\{2\ F^e(2) + F^e(3)\}:\{2\ F^e_{IV}(2) + F^e_{IV}(3)\} = x_i:x:x_e$, whereby the position of articulation calculating routine for a vowel / ;e/ in the word is completed. (E) Position of Articulation Calculating Routine for Vowel / ;o/

The routine for calculating the position of articulation of a vowel / ;o/ is different dependent on whether the position of articulation of the vowel / ;o/ is shifted toward the position of articulation of the monophthong / ;a/ or toward the position of articulation of the monophthong / ;u/. More specifically, if the value of $F(1)$ of the vowel / ;o/ in the word is larger than a threshold "BNDOU2" of $F(1)$ used for defining the boundary between two y values of the positions of articulation; $y = 3$ and $y = 4$, it is determined that the position of articulation of the vowel / ;o/ in the word is shifted toward the position of articulation of the monophthong / ;a/. Then, as described in the above Section (A), $F(1)$ of the vowel / ;o/ in the word is normalized from $F(1)$ of the monophthong / ;a/ and $F(1)$ of the monophthong / ;o/, and $F(2)$ of the vowel / ;o/ in the word is normalized from $F(2)$ of the monophthong / ;a/ and $F(2)$ of the monophthong / ;o/, thereby to calculate a table position (I, J) of the vowel / ;o/ in the word. Based on this table position (I, J), TABLE (I, J) is derived from the aforesaid conversion table, and the position of articulation (x, y) of the vowel / ;o/ in the word is calculated using the above Equation (1).

On the contrary, if the value of $F(1)$ of the vowel / ;o/ in the word is smaller than the threshold "BNDOU2", it is determined that the position of articulation of the vowel / ;o/ in the word is shifted toward the position of articulation of the monophthong / ;u/. In this case, the position of articulation of the vowel / ;o/ in the word is calculated by an algorithm similar to the position of articulation calculating algorithm (FIG. 8), as described in the above Section (C), effective when the position of articulation of the vowel /;u/ in the word is shifted toward the position of articulation of the monophthong /;o/. In the algorithm of this case, however, the y value of the position of articulation is set based on the thresholds "BNDOU1", "BNDOU2".

Figure 10:
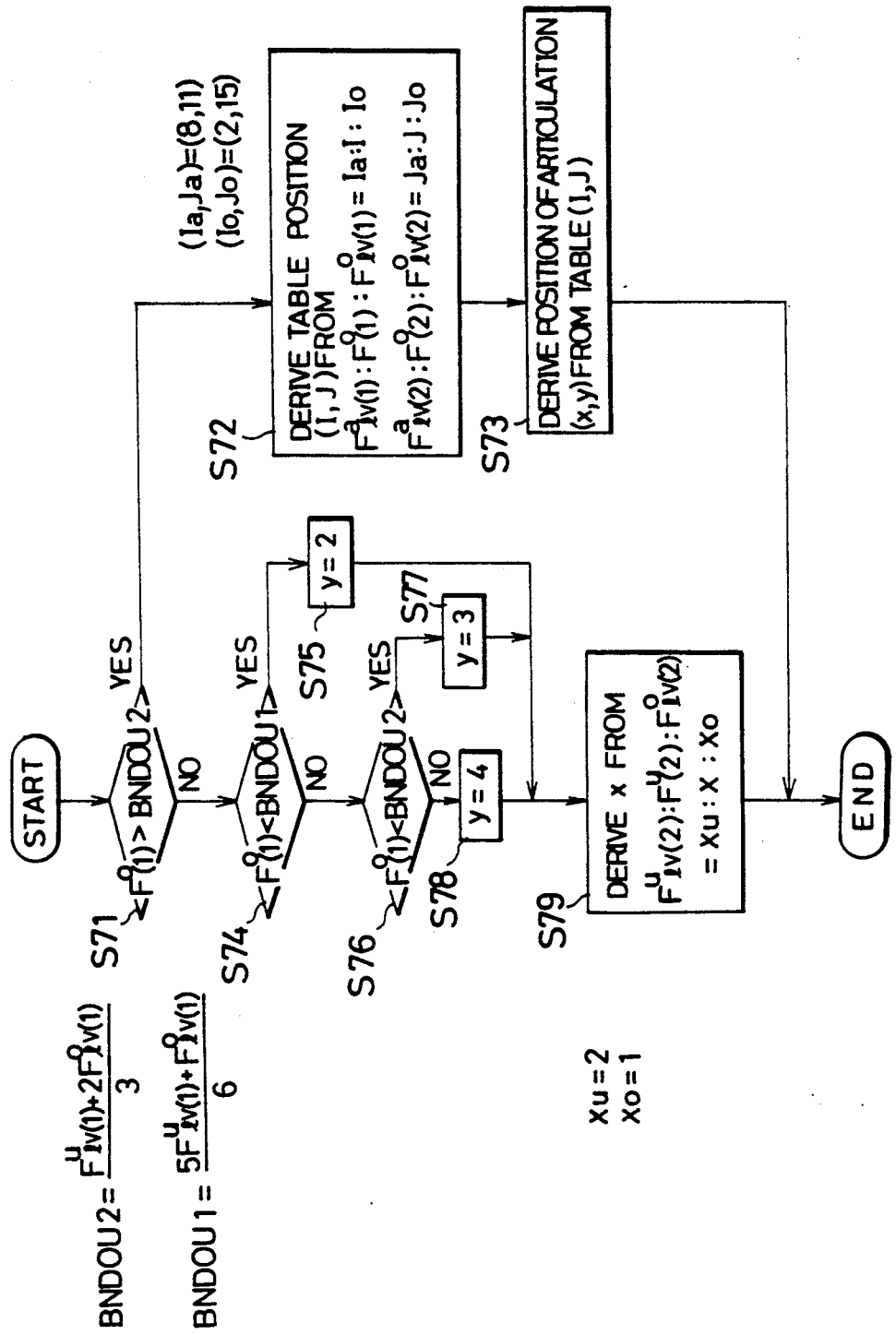
FIG. 10 is a flowchart of a position of articulation calculating routine for a vowel / [o]/ in the word of FIG. 5.

FIG. 10 is a flowchart of a position of articulation calculating routine for a vowel /;o/ in the word employed in the flowchart of FIG. 5. The position of articulation calculating routine for a vowel /;o/ in the word will be described below in more detail with reference to FIG. 10.

Step S71 determines whether or not the value of $F^o(1)$ is larger than the aforesaid threshold "BNDOU2". If the value of $F^o(1)$ is larger than "BNDOU2", the process goes to step S72. If not so, it goes to step S74.

Here, the threshold "BNDOU2" is a value set as below:

$$BNDOU2 = (F^u_{/1/}(1) + 2 F^o_{/1/}(1))/3$$

In step S72, I is calculated from $F^a_{/1/}(1):F^o(1):F^o_{/1/}(1) = I_a:I:I_o$, and J is calculated from $F^a_{/1/}(2):F^o(2):F^o_{/1/}(2) = J_a:J:J_o$.

In step S73, TABLE (I, J) is derived from the aforesaid conversion table based on the table position (I, J) of the vowel /;o/ in the word calculated in step S72. In accordance with TABLE (I, J) thus derived, the position of articulation (x, y) is calculated from the above equation (1), whereby the position of articulation calculating routine for a vowel /;o/ in the word is completed.

Step S74 determines whether or not the value of $F^o(1)$ is smaller than the aforesaid threshold "BNDOU1". If the value of $F^o(1)$ is smaller than "BNDOU1", the process goes to step S75. If not so, it goes to step S76.

Here, the threshold "BNDOU1" is a value set as below:

$$BUNDOU1 = (5 F^u_{/1/}(1) + F^o_{/1/}(1))/6$$

In step S75, the y value of the position of articulation is set to be y=2, followed by proceeding to step S79.

Step S76 determines whether or not the value of $F^o(1)$ is smaller than "BNDOU2". If the value of $F^o(1)$ is smaller than "BNDOU2", the process goes to step S77. If not so, it goes to step S78.

In step S77, the y value of the position of articulation is set to be y=3, followed by proceeding to step S79.

In step S78, the y value of the position of articulation is set to be y=4, followed by proceeding to step S79.

In step S79, x is calculated from $F^u_{/1/}(2):F^u(2):F^o_{/1/}(2) = x_u:x:x_o$, whereby the position of articulation calculating routine for a vowel /;o/ in the word is completed.

The position of articulation calculating algorithms for vowels in each word, the formant frequencies of the respective monophthongs, the positions of articulation (x, y) of the respective monophthongs, the table positions (IV, JV) of the respective monophthongs, the conversion table, the thresholds and others, as mentioned above, are stored in the transform equation storage device 6 of FIG. 1 and read out from the storage device 6, as required, when the position of articulation extracting device 5 executes the position of articulation extracting operation for vowels in the word.

In this embodiment, as described above, using the known formant frequencies of the monophthongs, the positions of articulation of vowels in the word are calculated in accordance with a predetermined algorithm from format frequencies of the vowels in the word present in an input voice. According to this embodiment, therefore, the positions of articulation as feature variables of a voice which are not dependent on speakers and languages can be extracted using formant frequencies characterizing respective phonemes.

It should be understood that the conversion table for use in this embodiment is not limited to the one illustrated in Table 1.

Next, a second embodiment will be described below in detail.

This embodiment is concerned with a vowel position of articulation extracting device 5 in which using a neural network, rules to derive positions of articulation of vowels in a word are automatically created through learning from frequency components of the vowels in the word, and the positions of articulation of the vowels in the word are derived in accordance with the created rules.

Outline of a neural network will first be explained. The neural network is a network simulating the structure of the human brain, and constituted by a plurality of units, each corresponding to a neuron in the brain, interconnected in a complicated manner.

The structure of each unit comprises a portion for receiving an input signal from another unit, a portion for converting the input signal in accordance with a transfer function, and a portion for outputting the converted result. As described later in detail, the plurality of units form a network of the hierarchical structure composed of an input layer, an intermediate layer and an output layer. Coupling factors (weights) indicative of the strength of couplings are attached to a coupling portion of each unit with other units.

The coupling factors indicate the strength of respective couplings between the units, and the network structure is varied by changing values of the coupling factors. Learning of the neural network means that data belonging to one of those two events which have the known relationship therebetween are successively input to the input layer of the network formed into the hierarchical structure, and the respective coupling factors are changed so as to reduce a difference between output data obtained at the output layer and data belonging to the other event and corresponding to the input data (i.e., target value=target data). Stated otherwise, learning of the neutral network is to vary the network structure such that when data belonging to one of those two events which have the predetermined relationship therebetween are input to the network, data belonging to the other event and corresponding to the input data is output from the network.

A neural network used in this embodiment has the structure shown in FIG. 11. This neural network has the three-layer structure composed of an input layer 21, an intermediate layer 22 and an output layer 23 arranged in this order from below on the figure. The input layer 21 includes sixteen units 24, the intermediate layer 22 includes ten units 25, and the output layer 23 includes fourteen units composed of seven units 26a, 26b, . . . , 26g and seven units 27a, 27b, . . . , 27g.

An output signal from one channel of the BPF group with 16 channels is applied to one of the sixteen units 24 in the input layer 21. Then, one group of seven units 26a, . . . , 26g in the output layer 23 each outputs any one of x coordinate values (1 to 7 shown in FIG. 2) of the position of articulation (for example, the units 26a to 26g corresponding to the coordinate values 1 to 7 respectively), while the other group of seven units 27a, . . . , 27g each outputs any one of y coordinate values (1 to 7 shown in FIG. 2) of the position of articulation (for example, the units 27a to 27g corresponding to the coordinate values 1 to 7 respectively). Each unit 24 of the input layer 21 is connected to all the units 25 of the intermediate layer 22. Each unit 25 of the intermediate layer 22 is connected to all the units 26a, . . . , 26g, 27a, . . . , 27g of the output layer 23. However, those units within the same layer are not interconnected with each other.

The neural network having the above structure is stored in the transform equation storage section 6 shown in FIG. 1, along with the coupling factors.

The neural network operates as follows.

Frequency components of vowels in an input voice are applied to the units 24, 24, . . . of the input layer 21, respectively. Specifically, in this embodiment, output values from the BPF group with 16 channels are applied to the corresponding units 24 of the input layer 21 using channel by channel. The respective center frequencies of the BPF group are given by dividing a frequency range of 300 to 3400 Hz into sixteen sub-ranges with equal intervals over the full scale.

The output values from the BPF group thus applied to the respective units 24 of the input layer are converted therein through a sigmoid function and then transmitted to each unit 25 of the intermediate layer 22. At this time, the total sum of values resulted from multiplying the output values of the units 24 in the input layer 21 by their coupling factors, respectively, is applied to each unit 25 of the intermediate layer 22. Likewise, each unit 25 of the intermediate layer 22 converts the values applied from the respective units 24 of the input layer 21 through the sigmoid function, and then outputs the converted value to each of the units 26a, . . . , 26g, 27a, . . . , 27g in the output layer 23. At this time, applied to each of the units 26a, . . . , 26g, 27a, . . . , 27g in the output layer 23 is the total sum of values resulted from multiplying the output values of the units 25 in the intermediate layer 22 by their coupling factors, respectively. Furthermore, each of units 26a, . . . , 26g, 27a, . . . , 27g in the output layer 23 converts the values applied from the respective units 25 of the intermediate layer 22 through the sigmoid function, and then outputs the converted value.

Here, the sigmoid function f(x) is given by the equation below:

$$f(x) = 1/(1 + \exp(-x + a))$$

where a is a constant

Based on the output values derived from the respective units 26a, . . . , 26g, 27a, . . . , 27g of the output layer 23, the position of articulation (x, y) is determined as follows. Among one group of seven units 26a, . . . , 26g in the output layer 23 corresponding to x of the position of articulation, the x coordinate value (e.g., x=2) corresponding to that unit which outputs the maximum value (e.g., unit 26b) is taken as the x value of the position of articulation. Likewise, among the other group of seven units 27a, . . . , 27g corresponding to y of the position of articulation, the y coordinate value (e.g., y=7) corresponding to that unit which outputs the maximum value (e.g., unit 27g) is taken as the y value of the position of articulation. The position of articulation (x, y) (e.g., (2, 7)) is determined in this way.

Learning of the above network is carried out in a manner below by using the Error Back Propagation algorithm as a learning algorithm. First, the output values (e.g., the values finally outputting a target value (2, 7)) from the BPF group are applied to the respective units 24 of the input layer 21. Then, among one group of units 26a, 26b, . . . , 26g in the output layer 23 outputting the x coordinate value of the position of articulation, "1" is applied to only that unit (e.g., unit 26b) which correspond to the target value of x of the position of articulation (e.g., x=2), while "0" is applied to the remaining units (e.g., units 26a, 26c, . . . , 26g) in the same group. On the other hand, among the other group of units 27a, 27b, . . . , 27g in the output layer 23 outputting the y coordinate value of the position of articulation, "1" is applied to only that unit (e.g., unit 27g) which correspond to the target value of y of the position of articulation (e.g., y=7), while "0" is applied to the remaining units (e.g., units 27a, 27c, . . . , 27f) in the same group. Then, modification amounts of the respective coupling factors adapted for the target value (e.g., (2, 7)) are derived using the Error Back Propagation algorithm to set new values of the respective coupling factors between the units. By repeating the above operation several times, the coupling factors of the respective units between the input layer 21 and the intermediate layer 22 and between the intermediate layer 22 and the output layer 23 are set such that among one group of units 26a, 26b, . . . , 26g in the output layer 23 outputting the x coordinate value of the position of articulation, only that unit (e.g., unit 26b) which correspond to the target value (e.g., x=2) outputs "1" and the remaining units output "0", while among the other group of units 27a, 27b, . . . , 27g in the output layer 23 outputting the y coordinate value of the position of articulation, only that unit (e.g., unit 27g) which correspond to the target value (e.g., y=7) outputs "1" and the remaining units output "0".

By making the neural network perform such learning for many speakers and various kinds of languages, the values of the coupling factors are eventually converged so that the correct position of articulation (x, y) can be output for applied frequency components of vowels in words in most cases. Stated otherwise, the neural network subjected to learning as mentioned above can automatically create the rules to directly derive the position of articulation from the output values from the BPF group (i.e., the frequency components of each vowel in the word), and after a sufficient degree of learning, it can output the proper position of articulation (x, y) for all the input values.

In this embodiment, as described above, the values of the position of articulation each vowel in a word can be derived from the output values (i.e., the frequency components) of the BPF group for the vowel in the word. According to this embodiment, therefore, the positions of articulation as feature variables of a voice which are not dependent on speakers and languages can be extracted using the frequency components of the voice.

In the foregoing second embodiment, one additional unit to which applies a value of the pitch of the voice waveform to the input layer 21 may be provided so that the number of units in the input layer 21 becomes 17 in total. In this case, the pitch value can be derived by using any of known techniques, such as the autocorrelation method and the cepstrum method, which have conventionally been practiced. The pitch of male voices has a mean value of 125 Hz and a standard deviation of 20.5 Hz, while the pitch of female voices has a mean value and a standard deviation about twice those of the pitch of male voices, respectively. In general, frequency components of female voices are shifted toward the higher frequency side than frequency components of male voices. This is attributable to a physiological difference between males and females. Accordingly, by applying information about the pitch value to the input layer 21, the frequency components of male voices and the frequency components of female voices are separately normalized by the neural network, making it expectable to more precisely calculate the positions of articulation of vowels in words.

In the foregoing second embodiment, the output values from the BPF group are applied to the respective units 24 of the input layer 21. This invention is however not limited to such arrangement. For example, the formant frequencies employed in the first embodiment may be input to the neural network so as to derive the position of articulation based on them.

Further, in the foregoing second embodiment, the sigmoid function is used as a transform function for converting the input signals applied to the input layer 21 or the intermediate layer 22. This invention is however not limited to use of the sigmoid function. As an alternative, a threshold function may be used.

In the foregoing second embodiment, the number of units in the input layer 21, the intermediate layer 22 and the output layer 23 which jointly constitute the neural network may appropriately be modified dependent on the number of channels of the BPF group for outputting the frequency component to be applied to the neural network, and/or the x and y coordinate values for representing the toning positions.

Hereinafter, a second invention will be described in detail with reference to an illustrated embodiment.

FIG. 12 is a block diagram of a voice recognition apparatus according to the second invention. A voice signal input from a microphone 31 is analyzed and processed by an acoustic analyzing device 32, so that a time series of acoustic parameters is output for each time unit (frame). The acoustic analysis in the acoustic analyzing device 32 can be performed by e.g., frequency analysis using a group of band-pass filters (BPF), frequency analysis through fast Fourier transform, cepstrum analysis, and LPC (linear prediction analysis).

Then the time series of acoustic parameters thus obtained is input to a pattern converting device 33 where a time series of articulatory vecotr composed of such elements as a narrow degree of a vocal tract, a point of articulation, a degree of nasalization, presence or absence of vibrations of the vocal cords, and a rounded degree is produced by the method of using a neural network of the multi-layered perceptron type described later in detail, for example. In other words, the input voice is expressed by the time series of articulatory vector (hereinafter referred to as a feature pattern). This articulatory vector is composed of those elements which are not dependent on fluctuations in the frequency components of voices caused by different speakers, making it possible to eliminate voice fluctuations due to a physiological difference between individual speakers.

FIGS. 13a to 13d show the waveform of an input voice when a Japanese word of "Ψ (juudai)" is phonated, a series of phoneme symbols, and respective elements of the tone vector. Thus, FIG. 13a shows the waveform of the input voice, and FIG. 13b shows a series of phoneme symbols corresponding to that waveform of the input voice. In FIG. 13b, bb represents a buzz burr, dz represents a voiced fricative, s represents silence, d represents a plosive [d], and a, i, u, e represents vowels [a], [i], [u], [e], respectively. FIG. 13c shows a time series of values of an element C indicating a degree of narrow in the articulatory vector. In FIG. 13c, a zone or segment in which the element C of the same value occurs successively (each segment composed of one group of frames each of which takes the same value of the element C as that of the adjacent one in the time series of the elements C) is expressed together as one area. FIG. 13d shows a set of time series of other elements in the articulatory vector than the element C, i.e., an antero-posterior coordinate value x of the point of articulation, a vertical coordinate value y of the point of articulation, a degree of nasalization n, presence or absence of vibrations of the vocal cords g, and a rounded degree l, in an analog fashion. In FIG. 13d, an increase and decrease in the value correspond to the anterior and posterior side for x, the higher and lower level for y, the larger and smaller degree for n, the presence and absence for g, and the larger and smaller degree for l, respectively. According, a j-th frame aj of the input voice can be expressed by $aj = (xj, yj, nj, gj, lj, Cj)$.

Meanwhile, reference patterns used for matching with the feature patterns of the input voice produced as mentioned above are also produced in a like manner to the feature patterns of the input voice. In other words, based on the feature parameters obtained from the acoustic analysis of voice samples, a time series of articulatory vectors is determined for each of the voice samples. Then, the reference patterns are created by deriving several typical time series of articulatory vectors through statistic process such as clustering. The reference patterns thus created are stored in a reference pattern storage section 6 shown in FIG. 12.

Referring to FIG. 12 again, matching between the feature patterns of the input voice and the reference patterns is carried out in a discriminating device 35. Specifically, DP matching is made between the time series of articulatory vectors of both the patterns. At this time, when the number of vocabularies to be recognized is too many, the number of the reference patterns to be used for matching in the discriminating device 35 is restricted in advance through preliminary selection made in a preliminary selecting device 34. This permits to reduce an amount of calculations in matching necessary for voice recognition.

The discriminating device 35 discriminates the input voice, based on distances D calculated between the respective reference patterns and the feature pattern of the input voice, by selecting that reference pattern which has the minimum distance D (i.e., the distance D = the minimum distance Dmin), among all the reference patterns selected by the preliminary selecting device 34.

Then, the minimum distance Dmin is compared with a preset reject threshold $\theta$. If the minimum distance Dmin is less than the reject threshold $\theta$, the input word voice is recognized as a word corresponding to the reference pattern which provides that minimum distance Dmin. If the minimum distance Dmin is equal to or greater than the reject threshold $\theta$, the input word voice is rejected. The determination result is then indicated on a display device 37.

Next, the preliminary selection made in the preliminary selecting device 34 and the matching made in the discriminating device 35 will be explained in detail. The preliminary selection of the reference patterns in the preliminary selecting device 34 is performed by using the element C (degree of narrow) in the aforesaid articulatory vector. Specifically, respective time series of the elements C (hereinafter referred to as C series patterns) for both the feature patterns of the input voice and the reference patterns are compared with each other. At this time, the C series pattern for each standard pattern stores therein standard durations of respective segments and allowable ranges of the standard durations of the respective segments. When the C series pattern of the feature pattern is compared with the C series pattern of each reference pattern, similarity therebetween is determined by referring not only the values of the elements C of the respective segments in the latter's C series pattern, but also the above standard durations of the respective segments and the allowable ranges thereof. This permits to select that reference pattern which is substantially matched with the feature pattern.

The matching in the discriminating device 35 is made using a method which is limited in the matching path by the elements C. Specifically, the distance between the segments of the same kind is calculated through DP matching. This permits to reduce an amount of calculations necessary for the DP matching. The matching distance D between the feature pattern of the input voice and the reference pattern is expressed by the following equation, assuming that the distance between i-th segments of both the patterns calculated through DP matching is given by Di, the weight for Di is given by p(k) (k=0, 1, 2), the value of the element C in the i-th segment is given by Ci, and the number of total segments is given by N:

$$D = \frac{1}{N} \sum_{i=1}^{N} p(Ci) \cdot Di / \sum_{i=1}^{N} p(Ci) \quad (p(Ci) \geq 0)$$

Here, taking into account stability due to a value of Ci (stop or closure of voice canal: Ci=0, narrowing: Ci=1, opening of voice canal: Ci=2) and variations in the spectra, the value of the weight p(Ci) is set such that p(0)<1, p(1)>1 and p(2)=1 holds.

Furthermore, the distance Di between i-th segments of the feature pattern of the input voice and the standard pattern is determined through the DP matching. At this time, assuming that the distance between frames belonging to the i-th segments of both the patterns necessary for such calculation is given by d, the distance between respective articulatory vectors of the frames belonging to the i-th segments of both the patterns is employed. Specifically, the distance d(aj, bk) between a j-th frame aj=(xj, yj, nj, gj, lj, Cj) of the feature pattern of the input voice and a k-th frame bk=(xk, yk, nk, gk, lk, Ck) of the reference pattern is expressed below, supposing weights for the respective elements to be wx, wy, wn, wg, wl, wc ($\geq 0$):

$$d(aj, bk) = \sqrt{WD/W}$$

$$WD = wx(xj-xk)^2 + wy(yj-yk)^2 + wn(nj-nk)^2 + wg(gj-gk)^2 + wl(lj-lk)^2 + wc(Cj-Ck)^2$$

$$W = wx + wy + wn + wg + wl + wc$$

Taking into account contribution of the respective elements to generation and perception of voices, the weights of the respective elements are set below:

$$(wc>) \; wx, \; wy > wn > wg > wl > 0$$

Since the elements x, y of the articularoty vector are most important elements, the weights wx, wy are set to be large values. However, wy=0, wx=1 may be set dependent on the value of the element C as described later. Since the element l is difficult to estimate and suffers from larger error as described later, the weight wl is set to be minimum or zero. Since the element g is largely dependent on how to produce voices and cannot be said as a stable feature variable, the weight wg is set to be a second smallest value rank next to the weight wl.

The element C has, as described above, been already used in the matching with the C series patterns for preliminary selection of the reference patterns, or for the matching path restriction in the matching between the feature pattern and the reference pattern in the discriminating device 35. Accordingly, the weight wc is not required to be used in calculating the distance d between the frames. Thus, wc=0 is set. However, in the case where the preliminary selection of the reference patterns based on the C series pattern is not carried out, or where the matching path restriction is not performed in the matching between the feature pattern and the reference patterns, the weight wc is set to be larger than the weights wx, wy. In this case, the matching between the feature pattern and the reference pattern is made as DP matching over full regions of the feature pattern and the reference pattern. Setting examples of the respective weights are shown in the following Table 2 for case 1 (including both the preliminary selection of the reference patterns and the matching path restriction) and case 2 (including neither the preliminary selection of the reference patterns nor the matching path restriction):

TABLE 2

| Weights | wx | wy | wn | wg | wl | wc |
| --- | --- | --- | --- | --- | --- | --- |
| Case 1 | 2, 1 | 2, 0 | 1 | 0.5 | 0.3, 0 | 0 |
| Case 2 | 2, 1 | 2, 0 | 1 | 0.5 | 0.3, 0 | 4 |

For the weights wx, wy, wl, either one of two values put in the Table 2 is used dependent on the value of the element C and other factors.

There will now be described in detail a manner of creating the respective elements C, x, y, n, g, l in the articulatory vector using a neural network, which manner is implemented in the pattern converting device 33 shown in FIG. 12 and functioning as a principal part of this embodiment.

A neural network used in this embodiment has the structure shown in FIG. 14. This neural network has the three-layer structure comprising an input layer 11, an intermediate layer 12 and an output layer 13 arranged in this order from below on the figure. The input layer 11 includes sixteen units 14 (in the case of a neural network creating the element C, 5 sets of units each of which sets comprises sixteen units 14 are arranged, as described later), the intermediate layer 12 includes units 15 in number dependent on the number of elements in the articulatory vector to be created, and the output layer 13 includes units 16 in number corresponding to the elements in the articulatory vector. An output signal from one channel of the BPF group with 16 channels is applied to one of the sixteen units 14 in the input layer 11. Then, the units 16 of the output layer 13 issue output values corresponding to the intended values of respective elements in the articulatory vector. Each unit 14 of the input layer 11 is connected to all the units 15 of the intermediate layer 12. Likewise, each unit 15 of the intermediate layer 12 is connected to all the units 16 of the output layer 13. However, those units within the same layer are not interconnected to each other.

The neural network having the above structure is stored in the pattern converting section 3 shown in FIG. 12, along with the coupling factors.

The neural network operates as follows.

The output data from the BPF group in the form of feature parameters of the input voice are respectively applied to the corresponding units 14 of the input layer 11 by channel. The output data from the BPF group thus applied to the respective units 14 of the input layer are converted therein through a sigmoid function and then transmitted to each unit 15 of the intermediate layer 12. At this time, the total sum of values resulted from multiplying the output values of the units 14 in the input layer 11 by their coupling factors, respectively, is applied to each unit 15 of the intermediate layer 12. Likewise, each unit 15 of the intermediate layer 12 converts the values applied from the respective units 14 of the input layer 11 through the sigmoid function, and then outputs the converted value to each unit 16 of the output layer 13. At this time, applied to each unit 16 of the output layer 13 is the total sum of values resulted from multiplying the output values of the units 15 in the intermediate layer 12 by their coupling factors, respectively. Furthermore, each unit 16 of the output layer 13 converts the values applied from the respective units 15 of the intermediate layer 12 through the sigmoid function, and then outputs the converted value. At this time, that the value issued from the respective units 16 of the output layer 13 corresponds to which elements in the articulatory vector, is determined by the network structure based on the coupling factors which are set through learning for each of the elements, as described later.

Next, a manner of creating the respective elements in the articulatory vector will be explained in detail for each of the elements in order.

(A) Creation of Element C

The element C indicating a degree of narrow is created using a neural network of the multi-layered perceptron type which is subjected to learning with the Error Back Propagation method (hereinafter referred to a BP method) as described later in detail. In the neural network employed for creating the element C, the number of the units 14 in the input layer 11 is eighty (corresponding to 5 sets of units each of which sets composed of sixteen units 14). The number of the units 15 in the intermediate layer 12 is ten, and the number of the units 16 in the output layer 13 is three. Naming those three units 16 of the output layer 13 to be 16a, 16b, 16c in order, one value of the element C, i.e., $C=0$, is allocated to the unit 16a, for instance. Another value of the element C, i.e., $C=1$, is allocated to the unit 16b. Further, still another value of the element C, i.e., $C=2$, is allocated to the unit 16c.

Target data to be used in the learning of the neural network is created as follows. By visually observing the spectrogram, each voice sample is labeled and the value of the element C is then derived from that label in accordance with predetermined rules. The learning of the neural network is carried out as follow, with target data given by the data thus derived and indicating the values of the elements C of voice samples.

In the learning, applied to the respective units 14 in the input layer 11 of the neural network are the acoustic parameters (i.e., the output data from the BPF group with 16 channels) for the relevant frame of the voice sample whose value of the element C is known, and two frames on each of the preceding and succeeding sides thereof by frame and by channel (thereby resulting in 80 sorts of output values of the BPF group).

Then, applied to the three units 16a, 16b, 16c of the output layer 13 are the target data relating to the relevant frame of the voice sample of which acoustic parameters are applied to the input layer 11 as mentioned above (i.e., the data providing an input value "1" to one of the units which is allocated with the known value of the element C for the relevant frame (any one of 16a, 16b, 16c), and an input value "0" to the remaining units). This causes the neural network to determine the network structure by itself, while modifying the coupling factors to be newly set such that the output values from the units 16a, 16b, 16c of the output layer 13 becomes equal to those values for the target data.

When creating the element C, the acoustic parameters of an input voice (i.e., the output data from the BPF group in the acoustic analyzing section 32) are applied to the input layer 11 of the neural network which has been subjected to the learning based on many target data in a manner as mentioned above. Then, the value of the element C allocated to that one among the units 16a, 16b, 16c of the output layer 13 which issues the maximum output value, is taken as a value of the element C for that input voice. In this connection, by making the neural network subjected to the learning with those target data which have been obtained from voice samples of many speakers, it becomes possible to create the value of the element C in a stable manner even for many and unspecified speakers.

(B) Creation of Coordinate (x, y) Comprising Elements x, y

The coordinate (x, y) which composed of the element x indicating the antero-posterior value of the point of articulation and the element y indicating the vertical value thereof, is created using a neural network of the multi-layered perceptron type subjected to learning through the BP method, as with the above case of the element C. In this case, however, the manner of creating the coordinate (x, y) of the point of articulation is different dependent on whether the input voice is in a vowel zone or a consonant zone. Here, the vowel zone corresponds to a segment in which the value of the element C holds $C=2$, and the consonant zone corresponds to a segment of $C=0, 1$.

(a) Vowel Zone (C=2)

In the neural network employed for creating the coordinate (x, y) of the point of articulation in the vowel zone, the number of the units 14 in the input layer 11 is sixteen as set forth before. The number of the units 15 in the intermediate layer 12 is ten, and the number of the units 16 in the output layer 13 is fourteen. The units 16 of the output layer 13 are divided into two groups each composed of seven units 16. The coordinate value of the element x is divided into 7 different values dependent on the magnitude thereof which are allocated to the seven units 16d, 16d, . . . in one group, respectively. Likewise, the coordinate value of the element y is divided into 7 different values dependent on the magnitude thereof which are allocated to the seven units 16e, 16e, . . . in the other group, respectively.

Target data to be used in the learning of the neural network is created as follows. That voice data of a vowel in the word which has been determined as a vowel zone by visually observing the spectrogram and labeled with the sort of vowel (any one of [a], [i], [u], [e], [o]), is subjected to acoustic analysis to extract formants thereof. Then, based on the formant frequencies of the monophthongs which have their coordinates (x, y) of the points of articulation determined in advance and hence already known, the coordinate (x, y) of the point of articulation of the vowel in the word is calculated from those formant frequencies of the vowel in the word which have been extracted as mentioned above, in accordance with a predetermined algorithm previously derived by many samples. The learning of the neural network is carried out as follow, with target data given by the data thus calculated and indicating the coordinate (x, y) of the point of articulation of the vowel in the word.

In the learning, applied to the respective units 14 in the input layer 11 of the neural network are the acoustic parameters (i.e., the output data from the BPF group with 16 channels) for the vowel in the word of the voice sample whose coordinate (x, y) of the point of articulation is known by channel. Then, applied to the seven units 16d in one group of the output layer 13 are the target data for the vowel in the word of which acoustic parameters are applied to the input layer 11 as mentioned above (i.e., the data providing an input value "1" to one of the units 16d which is allocated with the known x coordinate value of the point of articulation, and an input value "0" to the remaining units 16d). Likewise, applied to the seven units 16e in the other group of the output layer 13 are the target data for the vowel in the word (i.e., the data providing an input value "1" to one of the units 16e which is allocated with the known y coordinate value of the point of articulation, and an input value "0" to the remaining units 16e). This causes the neural network to determine the network structure by itself, while modifying the coupling factors to be newly set such that the output values from the units 16d, . . . , 16e, . . . of the output layer 13 becomes equal to those values for the target data.

When creating the elements x, y, the acoustic parameters of an input voice (i.e., the output data from the BPF group) are applied to the input layer 11 of the neural network which has been subjected to the learning based on many target data in a manner as mentioned above. Then, the x coordinate value allocated to that one among the seven units 16d in one group of the output layer 13 which issues the maximum output value, is taken as a value of the element x for that input voice. Likewise, the y coordinate value allocated to that one among the seven units 16e in the other group which issues the maximum output value, is taken as a value of the element y.

In this connection, by making the neural network subjected to the learning with those target data which have been obtained from voice samples of many speakers, it becomes possible to create the coordinate (x, y) of the point of articulation in a stable manner even for many and unspecified speakers.

(b) Consonant Zone (C=0, 1)

In the consonant zone, narrow or stop (closure) occurs somewhere in the vocal tract. The position of such narrow or closure represents a point of articulation of the consonant. This point of articulation may, as shown in FIG. 15a, locate in any of the both labia or lips (e.g., the case of [m] and [p]), the teeth/teeth-ridge (e.g., the case of [n], [t] and [s]), the hard palate (e.g., the case of [ʃ]), the velar (e.g., the case of [k] and [g]), and the glottis (e.g., the case of [h]) in the rearward direction from the lips. In this case, the vertical element y of the point of articulation remains fixed (y=0) and the value of the weight wy is hence given by wy=0, while only the antero-posterior element x is effective. FIG. 15b shows various values of the element x corresponding to positions of the actual points of articulation shown in FIG. 15a. In FIG. 15b, x=8 corresponds to a bilabial, x=7 corresponds to a dental, and x=2 corresponds to a soft-platal. A manner of creating the element x which indicates the position of the point of articulation for the consonant zone will now be described dependent on two cases of different values of the element, i.e., C=0, 1, in order.

i) Case of C=1 (Narrowing)

As shown in FIGS. 13b and 13c, when the input voice is in the segment of the element C of 1 (C=1), this segment corresponds to a voiced fricative zone [dz] or a plosive zone [d]. In such a voice zone, a fairly specific spectral shape can be observed dependent on the point of articulation. Accordingly, the value of the element x which indicates the point of articulation in the antero-posterior direction can be determined substantially uniquely by labels of the consonant and the succeeding vowel. Therefore, the value of the element x is determined based on labels of the consonant and the succeeding vowel in a voice sample which have been labeled by visually observing the spectrogram, and the data indicating the value of the element x for the consonant of that voice sample is employed as target data.

As with the case of creating the coordinate (x, y) of the point of articulation in the vowel zone, the element x of the point of articulation in the consonant zone is also created using a neural network of the multi-layered perceptron type that is constituted so as to create the element x of the point of articulation in the consonant zone through learning by the BP method. In the neural network employed here, the number of the units in the input layer 11 is sixteen, the number of the units in the intermediate layer 12 is ten, and the number of the units in the output layer 13 is eight in FIG. 14.

The acoustic parameters of an input voice (i.e., the output data from the BPF group with 16 channels) are applied to the respective units 14 of the input layer 11. Then, each unit of each layer converts the input value through the sigmoid function, and outputs the converted value to each unit of the subsequent layer. The output values from the eight units 16 of the output layer 13 correspond to the value of the element x of point of articulation in the consonant zone. In other words, numbering the respective units 16 of the output layer 13 to be 1, 2, . . . , 8 in this order from the right side on the figure, for instance, the number of the unit 16 which outputs the maximum value gives in itself the value of the element x.

In the learning, applied to the respective units 14 of the input layer 11 are the acoustic parameters (i.e., the output data from the BPF group) for the consonant which has the known value of the element x of the point of articulation. Then, the target data corresponding to the value of the element x for the consonant in the input data are applied to the respective units 16 of the output layer 13. In the case where the value of the element x in the input data is given by $x=i$ ($1 \leq i \leq 8$), the target data are such data as providing an input value "1" to the i-th unit 16i of the output layer, and an input value "0" to the remaining units 16.

When creating the element x, as mentioned above, the number of the unit among all the units 16 of the output layer 13 which outputs the maximum value, is taken as a value of the element x of the point of articulation in the consonant zone of the input voice. The following Table 3 shows the values of the element x and examples of CV (consonant-vowel) syllables which include consonants corresponding to the respective x values.

TABLE 3

| x | Examples of CV Syllables |
|---|---|
| 8 | pa, ba, ma |
| 7 | ta, da, na |
| 6 | chi, ri, shi |
| 5 | cha, sha, ro |
| 4 | ki, gi |
| 3 | ke, ge |
| 2 | ka, ko, ga, go |
| 1 | ha, ho | ii) Case of C=0 (Closure)

In the case where the value of the element C is 0 (C=0), the value of the element x of the point of articulation is difficult to create. Specifically, when the value of the element g indicating the presence or absence of vibrations of the vocal cords as described later is zero, i.e., g=0 (silence), there occurs a completely silent state. On the other hand, when g=1 (voicing) holds, a radiative sound occurs from the nasal cavity or throat and hence some discernible sound is present. Accordingly, in the case of the frame with C=0 and g=1, the value of the element x of the point of articulation is created by using the same neural network as that in the case of C=1. In the case of the segment with C=0 and g=0, the value of the element x of the point of articulation in this segment is determined as follows, by referring to the values of the elements x of the points of articulation in the immediately preceding and succeeding frames (assumed to be $x=xf$, $x=xb$, respectively). Thus, if $xf=xb$ holds, $x=xf$ is taken as the x value. If $xf \neq xb$, $x=xb$ is taken.

In this way, the value of the element x in the case where the value of the element C is zero (C=0) is not so correct as compared with the case of C=2, 1. Therefore, as explained above, the value of the weight wx used for calculating the distance d between the j-th frame aj of the feature pattern of the input voice and the k-th frame bk of the standard pattern is set to be $wx=1$ for the segment of C=0.

(C) Creation of Element g

The element g which indicates the presence or absence of vibrations of the vocal cords is created using a neural network of the multi-layered perceptron type subjected to learning by the BP method, with target data given by the values of the elements g for the voice samples which have been so labeled by visually observing the spectrogram. In this case, the number of the units 14 in the input layer 11 is sixteen, the number of the units 15 in the intermediate layer 12 is eight, and the number of the units 16 in the output layer 13 is two in FIG. 14.

In the learning, applied to the respective units 14 of the input layer 11 are the acoustic parameters (i.e., the output data from the BPF group) for the relevant frame of the voice sample which has the known value of the element g. Then, assuming that one of the two units 16 of the output layer 13 is named 16f and the other unit is named 16g, in the case where the value of the element g for the relevant frame of the input voice sample, which has the known value of the element g, is given by g=0, the target data providing an input value "0" to the unit 16f of the output layer 13, and an input value "1" to the unit 16g are applied to the output layer. On the other hand, in the case where the value of the element g for the input data is one (g=1), the target data providing an input value "1" to the unit 16f of the output layer 13, and an input value "0" to the unit 16g are applied to the output layer for the learning.

When creating the element g, the acoustic parameters (i.e., the output data from the BPF group) for an input voice are applied to the respective units 14 of the input layer 11. If the output value from the unit 16f of the output layer 13 is larger than that from the unit 16g, then the value of the element g is set to be g=1. If the output value from the unit 16f is smaller than that from the unit 16g, then the value of the element g is set to be g=0.

(D) Creation of Element n

The element n which indicates a degree of nasalization is created using a neural network of the multi-layered perceptron type subjected to learning by the BP method, with target data given by the values of the elements n for the voice samples which have been so labeled by visually observing the spectrogram. In this case, the number of the units 14 in the input layer 11 is sixteen, the number of the units 15 in the intermediate layer 12 is eight, and the number of the units 16 in the output layer 13 is three in FIG. 14.

The target data for the element n is created as follows. The state of nasalization in a voice is divided two kinds of portions; (1) buzz burr portion of a voiced plosive [bb] or murmur portion of a nasal consonant, and (2) portion where a vowel is nasalized such that the spectrum is flattened mainly in a first formant region. Then, the state which corresponds to neither (1) nor (2), i.e., the state of not a nasal, but a vowel, fricative or silence, is defined as a state (3). The value of the element n in the state (1) is set to be n=2, the value of the element n in the state (2) is set to be n=1, and the value of the element n in the state (3) is set to be n=0. When visually observing the spectrogram of a voice sample to create target data, labeling is made in a manner able to retrieve the states (1), (2) and (3). For the state (2), for instance, a nasalization label is attached along with a vowel label. The value of the element n is determined based on the label of the relevant frame of each voice sample thus labeled, and the data indicating the respective values of the element n for the voice samples are used as target data.

In the learning, applied to the respective units 14 of the input layer 11 are the acoustic parameters (i.e., the output data from the BPF group) for the voice sample which has the known value of the element n. Then, the above target data are applied to the respective units 16 of the output layer 13 as follows. The value 2 of the element n (n=2) is allocated to one (e.g., unit 16h) of the three units 16 of the output layer 13, and n=1 is allocated to another (e.g., unit 16i) of the three units 16. Further, (n=0) is allocated to the remaining one (e.g., unit 16j) of the three units 16. Stated otherwise, in the case of the value 2 of the element n (n=2), the target data providing an input value "1" to the unit 16h and an input value "0" to the unit 16i and the unit 16j are applied to the output layer. In the case of n=1, the target data providing an input value "1" to the unit 16i and an input value "0" to the unit 16h and the unit 16j are applied to the output layer. Further, in the case of n=0, the target data providing an input value "1" to the unit 16j and an input value "0" to the unit 16h and the unit 16i are applied to the output layer.

When creating the element n, the acoustic parameters (i.e., the output data from the BPF group) for an input voice are applied to the respective units 14 of the input layer 11. Then, the value of the element n allocated to one of the three units 16h, 16i, 16j of the output layer 13 which outputs the maximum value, is taken as a value of the element n for the input voice.

However, the method of creating the element n is executed mainly for the frame of C=2 and g=1. Specifically, the frame of C=0 and g=0 is made automatically correspondent to the above state (3). The frame of C=0 and g=1 is made automatically correspondent to the above state (1). Further, the frame of C=1 can be thought correspondent to the state (3). Accordingly, in those cases of C=0 and g=0, C=0 and g=1, as well as C=1, the value of the element n is not created, but determined uniquely from both the value of the element C and the value of the element g.

(E) Creation of Element l

The element l which indicates a rounded degree (or degree of labialization) is created using a neural network of the multi-layered perceptron type subjected to learning by the BP method, with target data given by the values of the elements l for the voice samples which have been so labeled by visually observing the spectrogram. In this case, the number of the units 14 in the input layer 11 is sixteen, the number of the units 15 in the intermediate layer 12 is eight, and the number of the units 16 in the output layer 13 is two in FIG. 14. The data indicating the value of the element l for the relevant frame of the voice sample determined based on the label are used as target data.

In the learning, applied to the respective units 14 of the input layer 11 are the acoustic parameters (i.e., the output data from the BPF group) for the relevant frame of the voice sample which has the known value of the element l. Then, the target data indicating the value of the element l for the relevant frame of the voice sample are applied to the respective units 16 of the output layer 13 for the learning.

When creating the element l, the acoustic parameters for an input voice are applied to the respective units 14 of the input layer 11. The value of the element l is then created based on the output values of the respective units 16 in the output layer 13.

In this case, because the accuracy of labeling for that frame which has a high rounded degree due to visual observation of the spectrogram, the excellent target data cannot be obtained. As a result, the accuracy of creating the element l is not so high. For the reason, as stated before, the value of the weight wl of the element l used for the matching in the discriminating device 35 is set to be small, so that contribution of the element l to recognition of a word voice is made small. Although the tone quality is varied dependent on changes in rounded/-flatness, the phoneme is not so affected. Thus, the recognition ability is not lowered even with the value of the weight wl set to be small.

In the voice recognition apparatus of this embodiment, as described above, by using the neural network which has created by itself the rules for converting a time series of acoustic parameters of a voice to a time series of the articulatory vector (i.e., the vector having a degree of narrow C, a point of articulation (x,y), a degree of nasalization n, the presence or absence of vibrations of the vocal cords g, and a rounded degree l as elements thereof) through learning by the BP method, the time series of the articulatory vector (i.e., feature pattern) of an input voice is created in the pattern converting device 33 based on the acoustic parameters of the input voice from the acoustic analyzing section 32 shown in FIG. 12. In a similar manner, reference patterns composed of articulatory vectors are created based on the acoustic parameters of voice samples, and the created reference patterns are stored in the reference pattern storage device 36. Then, the distance between the time series of the articulatory vector for the feature pattern of the input voice and the time series of the articulatory vector for each of the reference patterns is calculated in accordance with the predetermined sequence to make matching between the feature pattern and the reference pattern using that distance between the two time series of the articulatory vectors, thereby recognizing the word of the input voice.

As mentioned before, a voice signal contains fluctuations due to various factors. However, the above articulatory vector can eliminate those fluctuations which are caused by a physiological difference dependent on speakers, among such various factors contributable to fluctuations of the voice signal. Thus, the voice represented by the time series of the articulatory vector contains only those fluctuations which are caused dependent on manners of phonation, such as allophones and durations. In other words, according to this embodiment, since the feature pattern of the input voice and the reference pattern are both expressed by the articulatory vectors, the voice fluctuations caused by a physiological difference between individual speakers can be eliminated. As a result, it becomes possible to reduce the number of templates for the reference patterns and hence reduce an amount of calculations necessary for the matching.

In this embodiment, the articulatory vector is created by using a neural network which produces by itself the rules to create the articulatory vector through learning. Accordingly, the articulatory vector can be created by only simple operations without requiring complicated calculations, whereby an amount of calculations needed in creating the articulatory vector can be reduced. Further, by making the neural network subjected to learning with target data obtained from voice sampled phonated by many speakers, the articulatory vector can be created in a stable manner for all sorts of input voices.

Moreover, when the number of the reference patterns employed for the matching in the discriminating device 35 is too many because of a larger number of vocabularies, the reference patterns are preliminarily selected in advance by the preliminary selecting device 34 so as to restrict the number of reference patterns. Accordingly, an amount of calculations necessary for the matching can even more be reduced.

In the foregoing embodiment, the articulatory vector contains a degree of narrow of the vocal tract C, coordinates (x, y) of the articulatory point in the antero-posterior and vertical directions, the presence or absence of vibrations of the vocal cords g, a degree of nasalization n, and a rounded degree (or degree of labialization) l. However, this invention is not limited to this form of the articulatory vector. For example, dependent on the required accuracy of recognizing a word voice, that one of the vector elements which less contributed to recognition of the word voice, such as the element indicating a rounded degree l, may be omitted to further reduce an amount of calculations necessary for the matching.

The structure of the neural network in this invention is not limited to the above explained structure. Thus, the number of units in the input layer may be changed dependent on the number of channels contained in the BPF group. The number of units in the output layer may also be changed dependent on the stages of indication degree for the respective. In addition, the intermediate layer may be provided plural in number to further increase the accuracy of creating values of the elements.

Many widely different embodiments of the present invention may be constructed without departing from the spirit and scope of the present invention. It should be understood that the present invention is not limited to the specified embodiments described in this specification, except as defined in the appended claims.

What is claimed is:

1. A speech recognition apparatus using position of articulation for recognizing an input voice, said apparatus comprising:

means for analyzing frequency components of said input voice;

means for determining a vowel zone and a consonant zone of said input voice from said frequency components analyzed by said analyzing means; and means for calculating a position of articulation of said input voice by using said vowel zone and said consonant zone determined by said determining means by using a calculation process based on frequency components obtained from monophthongs whose phonation contents and articulation positions are known; and means for recognizing said input voice in accordance with said position of articulation calculated by said calculating means so as to output a recognized result.

2. An apparatus according to claim 1, wherein said calculating means has a neural network capable of self-producing rules by learning processes using an error back propagation method, and said positions of articulation of said input voice are calculated by said neural network from said frequency components in accordance with said self-produced rules.

3. An apparatus according to claim 2, wherein said apparatus further comprises means for obtaining consonant patterns from said consonant zone of said input voice, and comparing means having a storage means for storing reference consonant patterns and means for matching consonants patterns of said input voice determined from said consonant zone with said reference consonant patterns stored in said storage means.

4. An apparatus according to claim 3, wherein said storage means further stores reference articulation positions and said matching means is coupled to said calculating means for further comparing articulation positions calculated by said calculating means with said stored reference articulation positions in said stored means so as to calculate a similarity therebetween, and said apparatus further comprises a display means for displaying said calculated similarity obtained by said matching means.

* * * * *